(12) United States Patent
Agarwal et al.

(10) Patent No.: US 11,481,287 B2
(45) Date of Patent: Oct. 25, 2022

(54) USING A STREAM OF SOURCE SYSTEM STORAGE CHANGES TO UPDATE A CONTINUOUS DATA PROTECTION-ENABLED HOT STANDBY

(71) Applicant: Cohesity, Inc., San Jose, CA (US)

(72) Inventors: Shobhit Agarwal, San Jose, CA (US); Chinmaya Manjunath, San Jose, CA (US); Kishan Venkata Sravan Nerella, San Jose, CA (US); Shubham Arvind Barai, Nagpur (IN); Manvendra Singh Tomar, Madhya Pradesh (IN)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 17/181,940

(22) Filed: Feb. 22, 2021

(65) Prior Publication Data
US 2022/0269570 A1   Aug. 25, 2022

(51) Int. Cl.
G06F 12/00 (2006.01)
G06F 11/14 (2006.01)
G06F 3/06 (2006.01)

(52) U.S. Cl.
CPC .......... *G06F 11/1469* (2013.01); *G06F 3/067* (2013.01); *G06F 3/0619* (2013.01); *G06F 3/0664* (2013.01); *G06F 11/1451* (2013.01); *G06F 11/1464* (2013.01); *G06F 11/1484* (2013.01)

(58) Field of Classification Search
None
See application file for complete search history.

(56) References Cited

U.S. PATENT DOCUMENTS

| | | |
|---|---|---|
| 7,421,648 B1 | 9/2008 | Davis |
| 7,437,764 B1 | 10/2008 | Sobel |
| 8,020,037 B1 | 9/2011 | Schwartz |
| 8,086,585 B1 | 12/2011 | Brashers |
| 8,112,661 B1 | 2/2012 | La France |
| 8,190,583 B1 | 5/2012 | Shekar |
| 8,312,471 B2 | 11/2012 | Davis |
| 8,364,648 B1 | 1/2013 | Sim-Tang |
| 8,607,342 B1 | 12/2013 | Liao |
| 9,268,689 B1 | 2/2016 | Chen |
| 9,304,864 B1 | 4/2016 | Bushman |
| 9,311,190 B1 | 4/2016 | Bushman |
| 9,361,185 B1 | 6/2016 | Bushman |
| 9,471,441 B1 | 10/2016 | Lyadvinsky |

(Continued)

OTHER PUBLICATIONS

Cohesity, Cohesity Data Protection White Paper, 2016, Cohesity, pp. 1-12 (Year: 2016).

(Continued)

*Primary Examiner* — Daniel D Tsui
(74) *Attorney, Agent, or Firm* — Van Pelt, Yi & James LLP

(57) ABSTRACT

A stream of source system storage changes associated with an object are received at a backup system from a source system. The source system storage changes associated with the object are provided to a remote data recovery system. The remote data recovery system is configured to store the provided source system storage changes associated with the object. The backup system is utilized to generate one or more reference restoration points based on the stream of source system storage changes associated with the object.

19 Claims, 19 Drawing Sheets

(56) References Cited

U.S. PATENT DOCUMENTS

| | | |
|---|---|---|
| 9,594,514 B1 | 3/2017 | Bono |
| 9,621,428 B1 | 4/2017 | Lev |
| 9,983,812 B1 | 5/2018 | Don |
| 10,037,223 B2 | 7/2018 | Park |
| 10,162,528 B2 | 12/2018 | Sancheti |
| 10,169,077 B1 | 1/2019 | Sigl, Sr. |
| 10,175,896 B2 | 1/2019 | Battaje |
| 10,275,321 B1 | 4/2019 | Bajaj |
| 10,496,497 B1 | 12/2019 | Yadav |
| 10,503,612 B1 | 12/2019 | Wang |
| 10,545,776 B1 | 1/2020 | Kowalski |
| 10,877,928 B2 | 12/2020 | Nagrale |
| 10,896,097 B1 | 1/2021 | Purcell |
| 11,036,594 B1 | 6/2021 | Shats |
| 11,176,154 B1 | 11/2021 | Dasgupta |
| 2003/0033344 A1 | 2/2003 | Abbott |
| 2004/0250033 A1 | 12/2004 | Prahlad |
| 2006/0069861 A1 | 3/2006 | Amano |
| 2006/0182255 A1 | 8/2006 | Luck, Jr. |
| 2007/0153675 A1 | 7/2007 | Baglin |
| 2008/0208926 A1 | 8/2008 | Smoot |
| 2009/0089657 A1 | 4/2009 | Davis |
| 2009/0171707 A1 | 7/2009 | Bobak |
| 2009/0313503 A1 | 12/2009 | Atluri |
| 2010/0031170 A1 | 2/2010 | Carullo |
| 2010/0070725 A1 | 3/2010 | Prahlad |
| 2010/0106933 A1 | 4/2010 | Kamila |
| 2010/0122248 A1 | 5/2010 | Robinson |
| 2011/0022879 A1 | 1/2011 | Chavda |
| 2011/0106776 A1 | 5/2011 | Vik |
| 2011/0107246 A1 | 5/2011 | Vik |
| 2012/0203742 A1 | 8/2012 | Goodman |
| 2013/0006943 A1 | 1/2013 | Chavda |
| 2013/0179481 A1 | 7/2013 | Halevy |
| 2013/0191347 A1 | 7/2013 | Bensinger |
| 2013/0219135 A1 | 8/2013 | Knowles |
| 2013/0227558 A1 | 8/2013 | Du |
| 2013/0232480 A1 | 9/2013 | Winterfeldt |
| 2013/0232497 A1 | 9/2013 | Jalagam |
| 2013/0254402 A1 | 9/2013 | Anand |
| 2013/0322335 A1* | 12/2013 | Smith |
| 2014/0040206 A1 | 2/2014 | Ramakrishnan |
| 2014/0052692 A1 | 2/2014 | Zhang |
| 2014/0059306 A1 | 2/2014 | Bender |
| 2014/0165060 A1 | 6/2014 | Muller |
| 2014/0297588 A1 | 10/2014 | Babashetty |
| 2014/0359229 A1 | 12/2014 | Cota-Robles |
| 2014/0372553 A1 | 12/2014 | Blackburn |
| 2015/0193487 A1 | 7/2015 | Demidov |
| 2015/0278046 A1 | 10/2015 | Zellermayer |
| 2015/0363270 A1 | 12/2015 | Hammer |
| 2015/0370502 A1 | 12/2015 | Aron |
| 2015/0378765 A1 | 12/2015 | Singh |
| 2016/0004450 A1 | 1/2016 | Lakshman |
| 2016/0034356 A1 | 2/2016 | Aron |
| 2016/0048408 A1 | 2/2016 | Madhu |
| 2016/0070714 A1 | 3/2016 | D Sa |
| 2016/0085636 A1 | 3/2016 | Dornemann |
| 2016/0125059 A1 | 5/2016 | Jain |
| 2016/0162378 A1 | 6/2016 | Garlapati |
| 2016/0188898 A1 | 6/2016 | Karinta |
| 2016/0203060 A1 | 7/2016 | Singh |
| 2016/0321339 A1 | 11/2016 | Tekade |
| 2016/0357640 A1 | 12/2016 | Bushman |
| 2016/0357641 A1 | 12/2016 | Bushman |
| 2016/0357769 A1 | 12/2016 | Bushman |
| 2017/0031613 A1 | 2/2017 | Lee |
| 2017/0031622 A1 | 2/2017 | Nagarajan |
| 2017/0060710 A1* | 3/2017 | Ramani ........... G06F 11/2069 |
| 2017/0060884 A1 | 3/2017 | Goodman |
| 2017/0123935 A1 | 5/2017 | Pandit |
| 2017/0168903 A1 | 6/2017 | Dornemann |
| 2017/0185491 A1* | 6/2017 | Hajare ........... G06F 11/2097 |
| 2017/0185729 A1 | 6/2017 | Boray |
| 2017/0193116 A1 | 7/2017 | Wong |
| 2017/0206212 A1 | 7/2017 | Srivilliputtur Mannarswamy |
| 2017/0212680 A1 | 7/2017 | Waghulde |
| 2017/0337109 A1 | 11/2017 | Ramu |
| 2018/0004437 A1 | 1/2018 | Battaje |
| 2018/0004764 A1 | 1/2018 | Sudarsanam |
| 2018/0060106 A1 | 3/2018 | Madtha |
| 2018/0060187 A1 | 3/2018 | Chavda |
| 2018/0081766 A1 | 3/2018 | Ghuge |
| 2018/0081902 A1 | 3/2018 | McKenzie |
| 2018/0088973 A1 | 3/2018 | Subhraveti |
| 2018/0113625 A1 | 4/2018 | Sancheti |
| 2018/0196820 A1 | 7/2018 | Kremer |
| 2018/0212896 A1 | 7/2018 | Chang |
| 2018/0253414 A1 | 9/2018 | Hailpern |
| 2018/0293374 A1 | 10/2018 | Chen |
| 2018/0329637 A1 | 11/2018 | Battaje |
| 2019/0065277 A1 | 2/2019 | Raikov |
| 2019/0073276 A1 | 3/2019 | Yuen |
| 2019/0108266 A1 | 4/2019 | Manvar |
| 2019/0129799 A1 | 5/2019 | Kumarasamy |
| 2019/0132203 A1 | 5/2019 | Wince |
| 2019/0197020 A1 | 6/2019 | Yap |
| 2019/0215358 A1 | 7/2019 | Kobayashi |
| 2019/0220198 A1 | 7/2019 | Kashi Visvanathan |
| 2019/0228097 A1 | 7/2019 | Kassa |
| 2019/0278662 A1 | 9/2019 | Nagrale |
| 2019/0278663 A1 | 9/2019 | Mehta |
| 2020/0026538 A1 | 1/2020 | Cui |
| 2020/0034254 A1 | 1/2020 | Natanzon |
| 2020/0057567 A1 | 2/2020 | Hutcheson |
| 2020/0057669 A1 | 2/2020 | Hutcheson |
| 2020/0110755 A1 | 4/2020 | Waldman |
| 2020/0159625 A1 | 5/2020 | Hutcheson |
| 2020/0167238 A1 | 5/2020 | Killamsetti |
| 2020/0183794 A1 | 6/2020 | Dwarampudi |
| 2020/0233571 A1 | 7/2020 | Yuravlivker |
| 2020/0285449 A1 | 9/2020 | McIntosh |
| 2020/0394072 A1 | 12/2020 | Sreekantaswamy |
| 2021/0056203 A1 | 2/2021 | Qiao |
| 2021/0081087 A1 | 3/2021 | Wayne |
| 2021/0103556 A1 | 4/2021 | Nagrale |
| 2021/0232579 A1 | 7/2021 | Schechter |
| 2021/0318851 A1 | 10/2021 | Sahu |
| 2021/0382771 A1 | 12/2021 | Schniebel |
| 2022/0035714 A1 | 2/2022 | Schultz |

OTHER PUBLICATIONS

Gaetan Castlelein, Cohesity SnapFS and SnapTree, Aug. 9, 2017, Cohesity, pp. 1-4 (Year: 2017).

Actifio. "Getting Started with Actifio VDP." Sep. 23, 2020. https://web.archive.org/web/20200923181125/https://docs.actifio.com/10.0/PDFs/Introducing.pdf (Year: 2020).

C. Grace "Site Recovery Manager Technical Overview" Dec. 1, 2020. https://web.archive.org/web/20201201181602/https://core.vmware.com/resource/site-recovery-manager-technical-overview (Year: 2020).

Cloud Endure. "Cloud Endure Documentation." Dec. 1, 2020. https://web.archive.org/web/20201201022045/https://docs.cloudendure.com/CloudEndure%20Documentation.htm (Year: 2020).

M. Chuang. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).

M. McLaughlin. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).

Red Hat. "Red Hat Virtualization 4.3 Disaster Recovery Guide." Jul. 17, 2019. https://web.archive.org/web/20190717013417/https://access.redhat.com/documentation/en-us/red_hat_virtualization/4.3/html/disaster_recovery_guide/index (Year: 2019).

Red Hat. "Red Hat Virtualization 4.3 Product Guide." Jul. 17, 2019. https://web.archive.org/web/20190717013254/https://access.redhat.com/documentation/en-us/red_hat_virtualization/4.3/html/product_guide/index (Year: 2019).

(56) References Cited

OTHER PUBLICATIONS

VMware. "Site Recovery Manager Administration." May 31, 2019. https://docs.vmware.com/en/Site-Recovery-Manager/8.5/srm-admin-8-5.pdf (Year: 2019).
VMware. "Site Recovery Manager Evaluation Guide." Oct. 19, 2020. https://web.archive.org/web/20201019155135/https://core.vmware.com/resource/site-recovery-manager-evaluation-guide (Year: 2020).
Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).
"Backup Solution Guide"—Synology https://download.synology.com/download/www-res/brochure/backup_solution_guide_en-global .pdf (Year: 2019).
"Recovering File from an Amazon EBS Volume Backup"—Josh Rad, AWS, Feb. 1, 2019 https://aws.amazon.com/blogs/compute/recovering-files-from-an-amazon-ebs-volume-backup/ (Year: 2019).

\* cited by examiner

USING A STREAM OF SOURCE SYSTEM STORAGE CHANGES TO UPDATE A CONTINUOUS DATA PROTECTION-ENABLED HOT STANDBY

BACKGROUND OF THE INVENTION

A source system hosts one or more objects. Examples of objects include a file, a database, a virtual machine (VM), an application, a container, a pod, etc. A user associated with the source system may specify a recovery point objective (RPO) and a recovery time objective (RTO) for the one or more objects. RPO is a measure of the acceptable amount of data loss for the one or more objects after a disruption of the source system. RTO is a measure of how fast the one or more objects need to be back online after the disruption.

The user associated with the source system may specify a near-zero RPO and/or a near-zero RTO. This may require a corresponding hot standby for some or all of the one or more objects. Other systems may accomplish this by directly streaming data from the source system to a hot standby hosted at a remote data recovery system. However, this solution may reduce the performance of the source system because resources that could be used to perform operations on the source system are being used to stream the data.

BRIEF DESCRIPTION OF THE DRAWINGS

Various embodiments of the invention are disclosed in the following detailed description and the accompanying drawings.

DETAILED DESCRIPTION

Figure 1A:
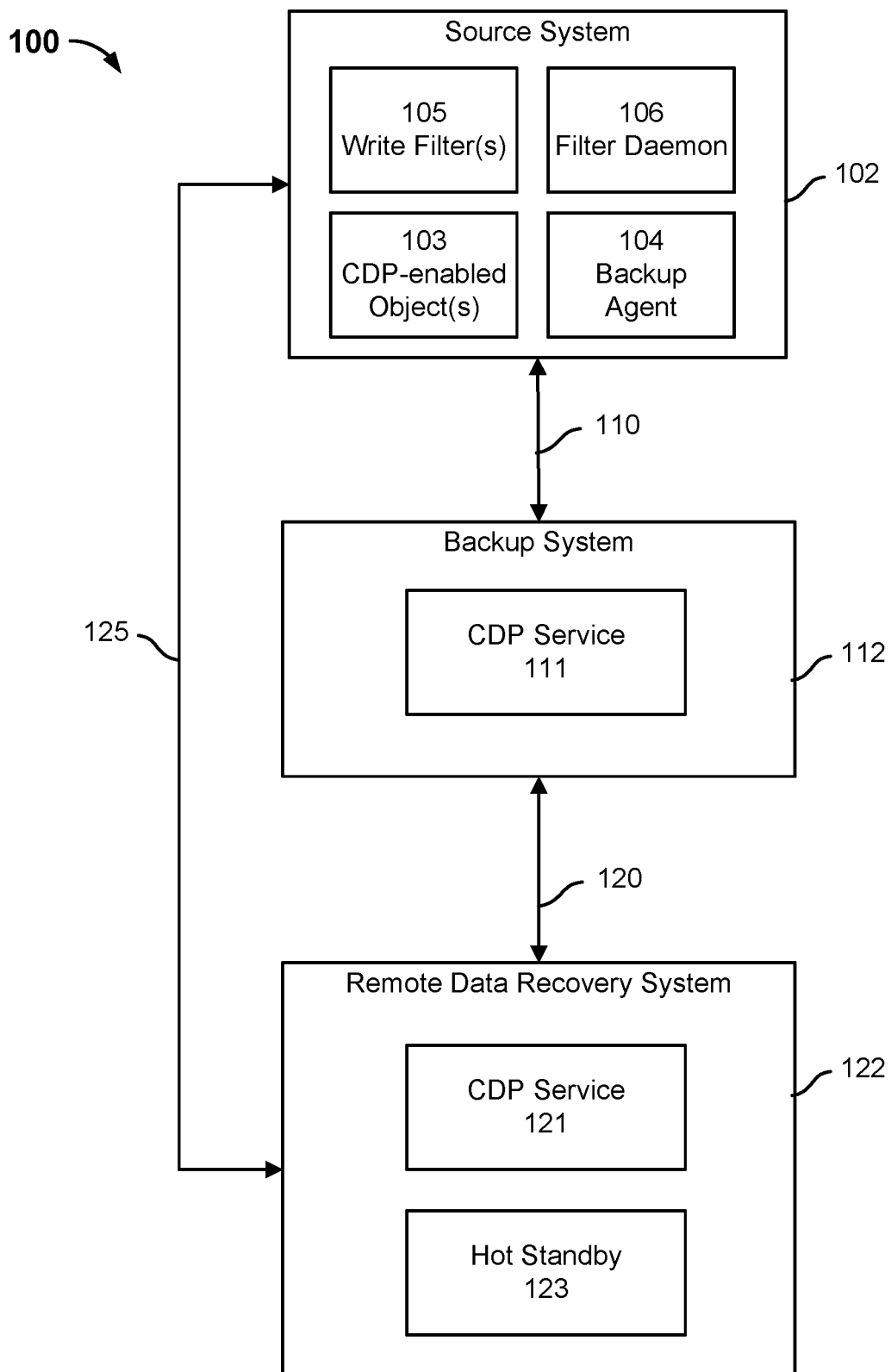
FIG. 1A is a block diagram illustrating an embodiment of a system for updating a hot standby corresponding to a CDP-enabled object.

Techniques to update a hot standby of a continuous data protection-enabled (CDP-enabled) object are disclosed herein. An object hosted by a source system is determined to need CDP. In some embodiments, the object is determined to need CDP based on a RPO and/or RTO specified by a user associated with the source system. In some embodiments, the object is determined to need CDP based on an object configuration specified by the user associated with the source system.

CDP is enabled for such objects by attaching a write filter to the objects. The write filter is configured to intercept all inputs/outputs (IOs) of an associated CDP-enabled object, filter out the read IOs, and provide a stream of source system storage changes associated with the CDP-enabled object (e.g., the intercepted write IOs) to a backup system. The write filter is configured to insert a snapshot marker in the stream of source system storage changes associated with the CPD-enabled object. The snapshot marker indicates an app consistent recovery point to which the CDP-enabled object may be restored. CDP may be enabled for a plurality of objects hosted by the source system and each of the CDP-enabled objects may be associated with a corresponding write filter. The source system may include a filter daemon that is configured to receive a stream of source system storage changes (e.g., all of the changes associated with the plurality of CDP-enabled objects) associated with each of the CDP-enabled objects and provide the stream of source system storage changes to the backup system.

The backup system is comprised of one or more nodes. The one or more nodes each includes a corresponding CDP service. One of the CDP services of the one or more nodes is configured to receive the stream of source system storage changes, including any snapshot markers, and store the stream of source system storage changes in a buffer associated with the CDP service. A change included in the stream of source system storage changes may include metadata associated with a change or the data associated with a change, or both. The buffer associated with the CDP service may be a cache, in-memory, a persistent memory, solid-state drive (SSD), etc. The buffer associated with the CDP service may be referred to as an intermediate storage.

The buffer associated with the CDP service includes a log. The entries of the log correspond to the intercepted write IOs. An entry may store metadata associated with a change. The metadata associated with a change may include a sequence number, a timestamp, an IO offset, an IO length, IO data bytes, a VM universally unique identifier, a VM disk full path for the source system, etc.

The backup system may generate an initial reference restoration point of a CDP-enabled object by requesting the source system to perform a full backup snapshot of the CDP-enabled object, ingesting the data associated with the full backup snapshot, storing the data associated with the full backup snapshot, and generating one or more tree data structures based on the stored data associated with the full backup snapshot. The one or more tree data structures enable the stored data associated with the full backup snapshot to be located. The full backup snapshot includes all of the data and metadata associated with a CDP-enabled object.

The backup system may generate a hot-standby corresponding to the CDP-enabled object by sending the data and metadata associated with the CDP-enabled object to a remote data recovery system. In response to receiving the data and metadata associated with the CDP-enabled object, the remote data recovery system is configured to generate a hot-standby corresponding to the CDP-enabled object. The hot-standby corresponding to the CDP-enabled object is generated to satisfy the RPO and/or RTO specified by a user associated with the source system. The remote data recovery system is configured to generate an initial reference restoration point of a CDP-enabled object based on the received data and metadata associated with the CDP-enabled object.

The source system continues to stream the source system storage changes to the backup system and in response, the backup system is configured to store the stream of source system storage changes in a log and generate one or more subsequent reference restoration points based on the stream of source system storage changes stored in the log. The backup system generates a subsequent reference restoration point by cloning a tree data structure associated with a previous reference restoration point and applying changes indicated by the one or more entries stored in the log that occurred after the previous reference restoration point and before a snapshot marker that occurred after the previous reference restoration point.

The backup system may subsequently update the hot-standby corresponding to the CDP-enabled object hosted by the remote data recovery system by replicating one or more entries included in the log that occurred after the previous reference restoration point and before the snapshot marker that occurred after the previous reference restoration point. However, in some circumstances, the backup system may have difficulty updating the hot-standby corresponding to the CDP-enabled object in a manner that satisfies the specified RPO and/or RTO because the backup system is using its finite processing resources to perform one or more other data management services, such as backup, restore, disaster recovery, replication, migration, analytics, compliance, security, etc.

The backup system is configured to implement the disclosed techniques to update a hot standby of a CDP-enabled object to ensure that the specified RPO and/or RTO is achieved. When one of the CDP services of the backup system receives the stream of source system storage changes, the CDP service is configured to replicate the stream of source system storage changes and provide to the remote data recovery system the stream of source system storage changes, and the backup system is configured to ingest, in parallel, the stream of source system storage changes. The remote data recovery system includes a CDP service that is configured to store the stream of source system storage changes in a log.

The remote data recovery system is configured to generate one or more subsequent reference restoration points based on one or more entries and one or more snapshot markers included in the log. The remote data recovery system is configured to generate a subsequent reference restoration point by cloning a tree data structure associated with a previous reference restoration point and applying changes indicated by the one or more entries stored in the log that occurred after the previous reference restoration point and before a snapshot marker that occurred after the previous reference restoration point.

The one or more subsequent reference restoration points generated by the remote data recovery system are generated independently from the backup system. This allows the remote data recovery system to achieve the specified RPO and/or RTO for a CDP-enabled object because resource constraints associated with the backup system have less influence on whether the remote data recovery system is able to achieve the specified RPO and/or RTO.

In some embodiments, the remote data recovery system is unsuitable for communications with the backup system. For example, a network connection failure may exist, the remote data recovery system is offline, the remote data recovery system has insufficient resources available to participate in communications with the backup system, the remote data recovery system is scheduled for maintenance, etc. During this time period, the backup system continues to receive the stream of source system storage changes from the source system. The backup system is configured to generate one or more reference restoration points based on the stream of source system storage changes. At some point in time, the remote data recovery system becomes suitable for communications with the backup system. When this occurs, a state of a CDP-enabled object hosted on the source system and a state of a hot standby corresponding to the CDP-enabled object hosted on the remote data recovery system is inconsistent. Other systems may update the hot standby corresponding to the CDP-enabled object by streaming, in sequential order, the source system storage changes that occurred during the period when the remote data recovery system was unsuitable for communications. However, this may prevent the specified RPO and/or RTO from being achieved because there may be a large amount of source system storage changes included in the stream.

Using the disclosed techniques, the backup system is configured to reduce the amount of time needed to update the hot standby corresponding to the CDP-enabled object in a manner that enables the remote data recovery system to achieve the specified RPO and/or the specified RTO in the event the remote data recovery system becomes unsuitable for communications.

The backup system is configured to determine that the remote data recovery system is unsuitable for communications. A stream of source system storage changes associated with a CDP-enabled object is received at the backup system from a source system while the remote data recovery system is unsuitable for communications. The backup system generates one or more reference restoration points based on the stream of source system storage changes associated with the CDP-enabled object. At some point in time, the remote data recovery system becomes suitable for communications.

The backup system is configured to reduce the amount of time needed to update the hot standby corresponding to the CDP-enabled object hosted on the remote data recovery system by providing to the remote data recovery system data chunks that are not stored by the remote data recovery system that are associated with a closest reference restoration point generated by the backup system prior to the remote data recovery system becoming suitable for communications. The backup system determines a difference between a closest reference restoration point generated by the backup system prior to the remote data recovery system becoming unsuitable for communications and the closest reference restoration point generated by the backup system prior to the remote data recovery system becoming suitable for communications. The determined difference indicates unique chunks that are not stored by the remote data recovery system. The determined difference also indicates changes to metadata that are not stored by the remote data recovery system.

The determined difference may be determined by traversing the tree data structure corresponding to the closest reference restoration point generated by the backup system prior to the remote data recovery system becoming suitable for communications and the tree data structure corresponding to the closest reference restoration point generated by the backup system prior to the remote data recovery system becoming unsuitable for communications to determine data chunks that are not stored by the remote data recovery system that are associated with a closest reference restoration point generated by the backup system prior to the remote data recovery system becoming suitable for communications.

The backup system is configured to provide to the remote data recovery system the data changes (data, metadata, or both) associated with the closest reference restoration point generated by the backup system prior to the remote data recovery system becoming suitable for communications that are not stored by the remote data recovery system. In response to receiving the data changes, the remote data recovery system is configured to generate a reference restoration point by updating the hot standby corresponding to the CDP-enabled object.

After the hot standby corresponding to the CDP-enabled object is updated to a state that corresponds to the closest reference restoration point generated by the backup system prior to the remote data recovery system becoming suitable for communications, the stream of source system storage changes associated with the CDP-enabled object that occurred after the closest reference restoration point generated by the backup system prior to the remote data recovery system becoming suitable for communications are provided from the backup system to the remote data recovery system. In response, the remote data recovery system is configured to update the hot standby corresponding to the CDP-enabled object based on the stream of source system storage changes. As a result, the specified RPO and/or RTO associated with the CDP-enabled object is more likely to be achieved.

FIG. 1A is a block diagram illustrating an embodiment of a system for updating a hot standby corresponding to a CDP-enabled object. In the example shown, source system 102 is coupled to backup system 112 via connection 110, backup system 112 is coupled to remote data recovery system 122 via connection 120, and remote data recovery system 122 is coupled to source system 102 via connection 125. Connections 110, 120, 125 may be a LAN, WAN, intranet, the Internet, and/or a combination thereof.

Source system 102 may be comprised of one or more CDP-enabled objects 103, a backup agent 104, one or more write filters 105, and a filter daemon 106. Source system 102 may include one or more storage volumes (not shown) that are configured to store file system data associated with the one or more CDP-enabled objects 103.

Backup agent 104 may be configured to cause source system 102 to perform a reference snapshot (e.g., a full backup snapshot). A full backup snapshot may include all of the file system data associated with one, some, or all of the one or more CDP-enabled objects 103 at a particular moment in time. In some embodiments, backup agent 104 is running on source system 102. In some embodiments, backup agent 104 is running in one of the one or more CDP-enabled objects 103. In some embodiments, backup agent 104 is running on source system 102 and a separate backup agent 104 is running in one of the one or more CDP-enabled objects 103.

In some embodiments, an object includes a backup function and is configured to perform a reference snapshot on its own without backup agent 104. In some embodiments, source system 102 includes a backup function and is configured to perform a reference snapshot on its own without backup agent 104. In some embodiments, backup system 112 may provide instructions to source system 102, causing source system 102 to execute backup functions without backup agent 104.

An object hosted by source system 102 is determined to need CDP. In some embodiments, the object is determined to need CDP based on a RPO and/or RTO specified by a user associated with the source system. In some embodiments, the object is determined to need CDP based on an object configuration specified by the user associated with source system 102. Other systems may accomplish this by directly streaming object data from source system 102 to a hot standby 123 hosted at remote data recovery system 122. However, this solution may reduce the performance of source system 102 because resources that could be used to perform operations on source system 102 are being used to stream the data to remote data recovery system 122.

CDP is enabled for an object by attaching a write filter to an object determined to need CDP. A write filter may be attached to a CDP-enabled object prior to a reference snapshot (e.g., full snapshot) of source system 102 being initiated to provide CDP for the CDP-enabled object to which the write filter is attached. The write filter may be attached at a disk layer of the object (e.g., disk write filter), a file system layer of the object (e.g., file system write filter), or a virtualized layer of the object (e.g., virtualized write filter). An object may be associated with one or more disks. A corresponding write filter may be attached to each of the one or more disks. A disk may be associated with one or more write filters.

A write filter is configured to intercept all IOs of an associated CDP-enabled object, filter out the read IOs, and provide a stream of the changes to the storage associated with the CDP-enabled object (e.g., intercepted write IOs) to backup system 112. A write filter is configured to attach a sequence number to each intercepted write IO. The sequence number may include an incarnation ID and a change ID. In some embodiments, the incarnation ID indicates an incarnation of the write filter and is incremented each time the write filter is restarted after a crash (e.g., object crash, filter crash). In some embodiments, the incarnation ID is not incremented after a clean restart of an object. The change ID is incremented for each intercepted write IO. For example, the sequence number may be represented as [incarnation ID, change ID]. The sequence number may be [0, 0], [0, 1] . . . [0, n]. In the event the write filter goes offline after a crash and comes back online, the incarnation ID may be incremented such that the sequence numbers attached to the intercepted write IOs may be [1, 0], [1, 1] . . . [1,n].

A write filter is configured to insert a snapshot marker in the stream of changes to the storage associated with the object hosted on source system 102. The snapshot marker indicates an app consistent recovery point to which the CDP-enabled object may be restored. Write IOs that occur before the snapshot marker are associated with a first reference restoration point. Write IOS that occur after the snapshot marker are associated with a second reference restoration point.

The one or more write filters 105 are configured to provide their corresponding stream of source system storage changes to filter daemon 106. Filter daemon 106 is configured to collect the stream of source system storage changes from the one or more write filters 105 and stream the stream of source system storage changes to backup system 112. In some embodiments, filter daemon 106 streams the source system storage changes as they are received. In some embodiments, filter daemon 106 is configured to stream batches of source system storage changes (e.g., after a threshold number of source system storage changes have been accumulated). Filter daemon 106 may be configured to cache the received stream of source system storage changes until they are provided to backup system 112.

Backup system 112 is configured to generate an initial reference restoration point of a particular CDP-enabled object by requesting source system 102 to perform a full backup snapshot of the particular CDP-enabled object, ingesting the data associated with the full backup snapshot, storing the data associated with the full backup snapshot, and generating based on the stored data associated with the full backup snapshot, one or more tree data structures that enable the stored data associated with the full backup snapshot to be located. In some embodiments, source system 102 performs a full backup snapshot of the particular CDP-enabled object and other CDP-enabled objects hosted by source system 102 in response to the request. In some embodiments, source system 102 performs a full backup snapshot of the particular CDP-enabled object in response to the request. The full backup snapshot includes all of the data and metadata associated with a CDP-enabled object included in the full backup snapshot.

Backup system 112 may generate a hot-standby corresponding to the CDP-enabled object by sending the data and metadata associated with the CDP-enabled object to remote data recovery system 122. In some embodiments, backup system 112 is configured to ingest the data associated with a backup snapshot and in parallel, send the data and the metadata associated with the CDP-enabled object to remote data recovery system 122. In some embodiments, backup system 112 is configured to ingest the data associated with a backup snapshot and separately send the data and the metadata associated with the CDP-enabled object to remote data recovery system 122.

In response to receiving the data and metadata associated with the CDP-enabled object, remote data recovery system 122 is configured to generate hot-standby corresponding to the CDP-enabled object 123. The hot-standby corresponding to the CDP-enabled object 123 is generated to satisfy the RPO and/or RTO specified by a user associated with source system 102. Remote data recovery system 122 is configured to generate an initial reference restoration point of a CDP-enabled object based on the received data and metadata associated with the CDP-enabled object.

The one or more write filters 105 and filter daemon 106 are configured to provide CDP for the one or more CDP-enabled objects 103. A stream of source system storage changes associated with the one or more CDP-enabled objects is continuously being provided from source system 102 to backup system 112. Backup agent 104 may provide to the CDP-enabled object a command to generate an intermediate reference restoration point. A write filter associated with the CDP-enabled object may intercept the command as it is being provided to the CDP-enabled object and insert a snapshot marker in between IOs associated with the CDP-enabled object. The snapshot marker indicates a time at which an intermediate reference restoration point associated with the CDP-enabled object was requested. The snapshot marker provides an intermediate reference restoration point, which may be used to identify a version of the CDP-enabled object to be used to restore the CDP-enabled object to a particular point in time.

Backup system 112 is comprised of one or more nodes. The one or more nodes each includes a corresponding CDP service 111. CDP service 111 is configured to receive the stream of source system storage changes, including any snapshot markers, and store the stream of source system storage changes in a buffer associated with CDP service 111. A change included in the stream may include metadata associated with a change or the data associated with a change, or both.

The buffer associated with CDP service 111 includes a log. The entries of the log correspond to the stream of source system storage changes. An entry may store metadata associated with a change. The metadata associated with a change may include a sequence number, a timestamp, an IO offset, an IO length, IO data bytes, a VM universally unique identifier, a VM disk full path for the source system, etc.

Backup system 112 is configured to generate one or more subsequent reference restoration points based on one or more entries and one or more snapshot markers included in the log of CDP service 111. A subsequent reference restoration point is generated by cloning a tree data structure associated with a previous reference restoration point and applying changes indicated by the one or more entries that occurred after the previous reference restoration point and before a snapshot marker that occurred after the previous reference restoration point. Backup system 112 may subsequently update the hot-standby corresponding to the CDP-enabled object hosted on remote data recovery system 122 by replicating one or more entries included in the log that occurred after the previous reference restoration point and before the snapshot marker that occurred after the previous reference restoration point.

However, in some circumstances backup system 112 may have difficulty updating the hot-standby corresponding to the CDP-enabled object 123 in a manner that satisfies the specified RPO and/or RTO because backup system 112 is using its finite processing resources to perform one or more other data management services, such as backup, restore, disaster recovery, replication, migration, analytics, compliance, security, etc.

When CDP service 111 receives the stream of source system storage changes, CDP service 111 is configured to replicate the stream of source system storage changes and provide to remote data recovery system 122 the stream of source system storage changes while backup system 112 ingests the stream of source system storage changes. Remote data recovery system 122 includes CDP service 121 that is configured to store the stream of source system storage changes in a log.

Remote data recovery system 122 is configured to generate one or more subsequent reference restoration points based on one or more entries and one or more snapshot markers included in the log. A subsequent reference restoration point is generated by cloning a tree data structure associated with a previous reference restoration point and applying changes indicated by the one or more entries that occurred after the previous reference restoration point and before a snapshot marker that occurred after the previous reference restoration point.

The one or more subsequent reference restoration points generated by remote data recovery system 122 are generated independently from backup system 112. This allows remote data recovery system 122 to achieve the specified RPO and/or RTO for a CDP-enabled object because resource constraints associated with backup system 112 have less influence on influence whether remote data recovery system 122 is able to achieve the specified RPO and/or RTO.

Figure 1B:
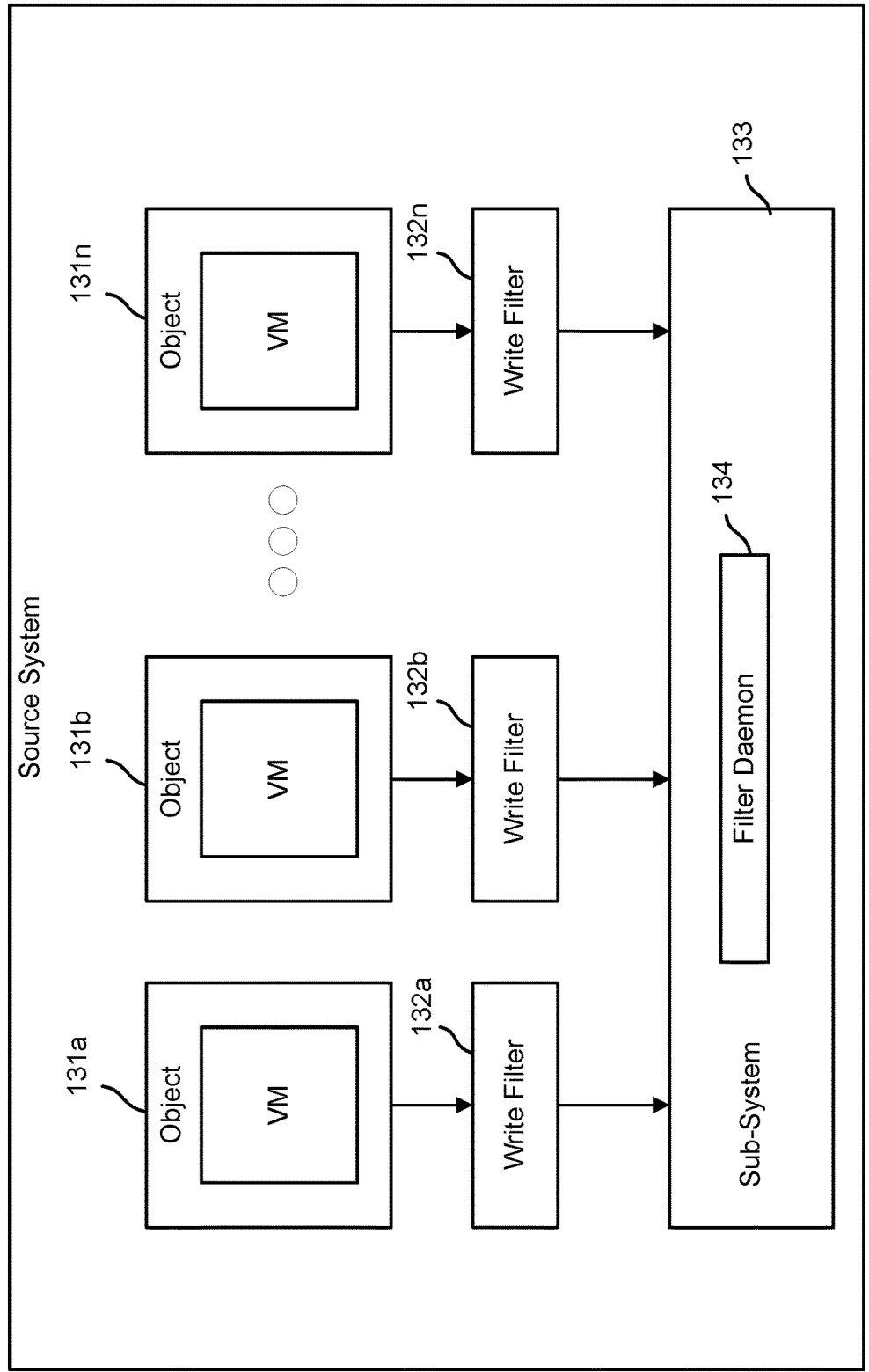
FIG. 1B is a block diagram illustrating an example of a source system in accordance with some embodiments.

FIG. 1B is a block diagram illustrating an example of a source system in accordance with some embodiments. In the example shown, source system 130 is comprised of a first object 131a, a second object 131b, ..., and an nth object 131n. Each object may be a different VM. Although FIG. 1B depicts an object as a VM, source system 130 may host different objects, such as a database, an application, a container, a pod, etc.

CDP is enabled for objects 131a, 131b, 131n. To enable CDP for an object, a write filter is attached to an object. In the example, object 131a is associated with write filter 132a, object 131b is associated with write filter 132b, and object 131n is associated with write filter 132n. A write filter is configured to intercept IOs associated with the object to which the write filter is coupled. A write filter may include a sequence number with the intercepted write IO. A write filter is configured to provide a stream of source system storage changes (e.g., intercepted write IOs) to filter daemon 134.

Source system 130 may include a sub-system 133 (e.g., hypervisor) that includes filter daemon 134. In some embodiments, filter daemon 134 is configured to collect the stream of source system storage changes and/or snapshot marker(s) provided by write filters 132a, 132b, 132n. In some embodiments, filter daemon 134 is configured to stream to a backup system the intercepted write IOs and/or snapshot marker(s) as they are received. In some embodiments, filter daemon 134 is configured to stream the batches of intercepted write IOs and/or snapshot marker(s) to the backup system. In some embodiments, filter daemon 134 streams the source system storage changes associated with a CDP-enabled object to a specific node of the backup system. In some embodiments, filter daemon 134 streams (separately or in parallel) the source system storage changes associated with a CDP-enabled object to a plurality of cluster nodes of the backup system.

In some embodiments, a backup system, such as backup systems 112, 140 periodically request (e.g., every 15 mins) for a respective configuration file associated with objects 131a, 131b, 131n. In response, source system 130 provides the requested configuration file. In response to receiving a configuration file, the backup system is configured to store the configuration file and also provide the configuration file to a remote data recovery system. The remote data recovery system may use such a configuration file to update a hosted virtual machine.

Figure 1C:
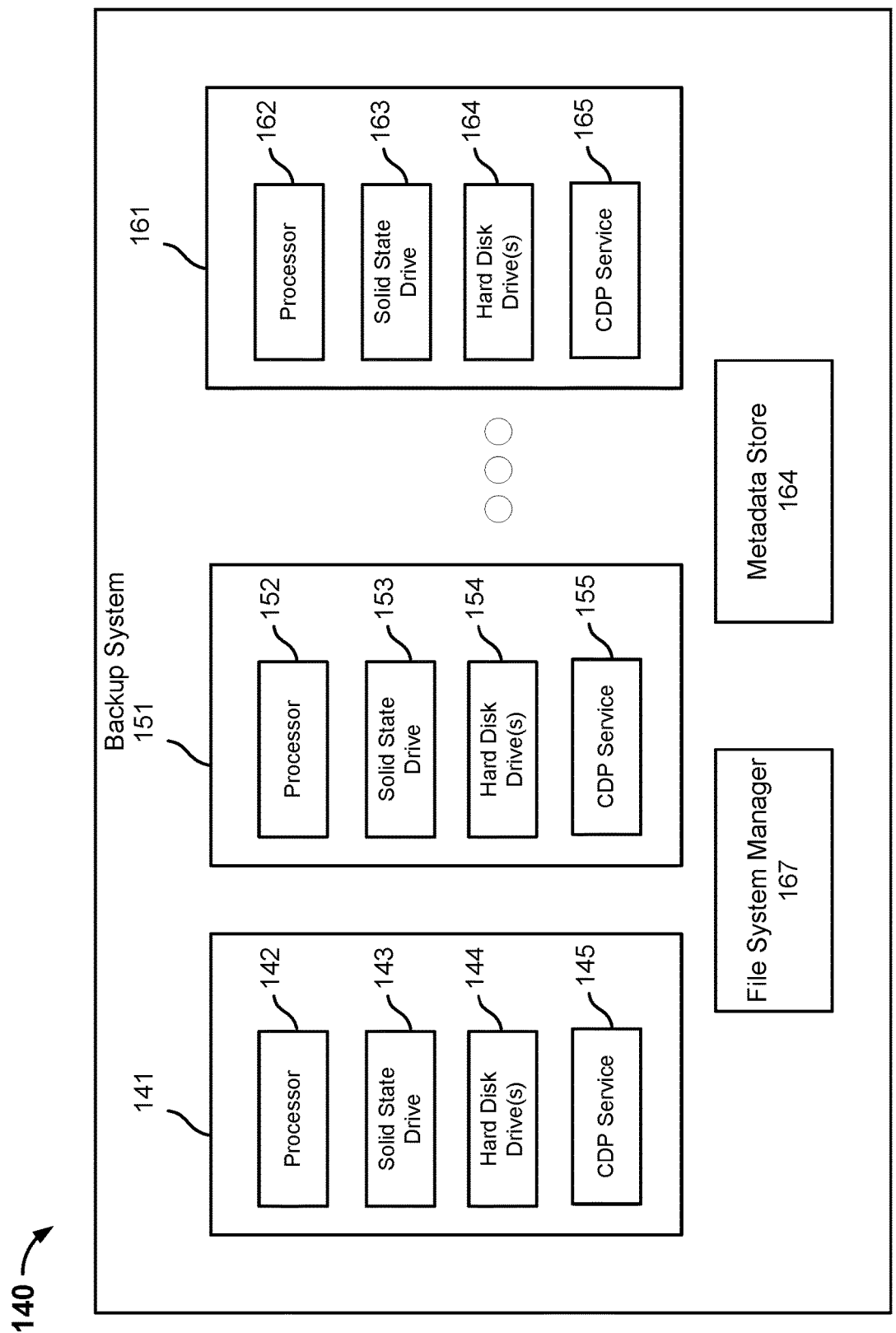
FIG. 1C is a block diagram illustrating an example of a backup system in accordance with some embodiments.

FIG. 1C is a block diagram illustrating an example of a backup system in accordance with some embodiments. Backup system 140 includes a first node 141, a second node 151, ..., and an nth node 161. In some embodiments, the nodes 141, 151, 161 are homogenous nodes where each node has the same capabilities (e.g., processing, storage, memory, etc.). In some embodiments, at least one of the nodes 141, 151, 161 is a heterogeneous node with different capabilities (e.g., processing, storage, memory, etc.) than the other nodes of the backup system 140.

In some embodiments, each node has a corresponding processor, a corresponding CDP service, and a plurality of storage tiers. A first storage tier may correspond to a storage with faster access times than a second storage tier. In the example shown, a first storage tier corresponds to a solid state drive and a second storage tier corresponds to a hard disk drive.

In some embodiments, a node of backup system 140 includes a processor, memory, and a plurality of storage devices. The plurality of storage devices may include one or more solid state drives, one or more hard disk drives, or a combination thereof. In the example shown, nodes 141, 151, 161 include respective processors 142, 152, 162, respective solid state drives 143, 153, 163, respective hard disk drives 144, 154, 164, and respective CDP services 145, 155, 165.

In some embodiments, a node of backup system 140 includes a processor and memory, and is coupled to a separate storage device. The separate storage device may include one or more storage devices (e.g., flash storage devices). A storage device may be segmented into a plurality of partitions. Each of the nodes 141, 151, 161 may be allocated one or more of the partitions. The one or more partitions allocated to a node may be configured to store data associated with some or all of the plurality of objects that were backed up to backup system 140. For example, the separate storage device may be segmented into 10 partitions and backup system 140 may include 10 nodes. A node of the 10 nodes may be allocated one of the 10 partitions.

In some embodiments, a node of backup system 140 includes a processor, memory, and a storage device. The node may be coupled to a separate storage device. The separate storage device may include one or more storage devices. A storage device may be segmented into a plurality of partitions. Each of the nodes 141, 151, 161 may be allocated one or more of the partitions. The one or more partitions allocated to a node may be configured to store data associated with some or all of the plurality of objects that were backed up to backup system 140. For example, the separate storage device may be segmented into 10 partitions and backup system 140 may include 10 nodes. A node of the 10 nodes may be allocated one of the 10 partitions.

Backup system 140 may be a cloud instantiation of a backup system. A configuration of cloud instantiation of backup system 140 may be a virtual replica of backup system 140. For example, backup system 140 may be comprised of three cluster nodes, each cluster node with a storage capacity of 10 TB. A cloud instantiation of backup system 140 may be comprised of three virtual nodes, each virtual node with a storage capacity of 10 TB. In other embodiments, a cloud instantiation of backup system 140 may have more storage capacity than an on-premises instantiation of backup system 140. In other embodiments, a cloud instantiation of backup system 140 may have less storage capacity than an on-premises instantiation of backup system 140.

Backup system 140 may receive from a source system, such as source system 102, the file system data associated with a CDP-enabled object included in a reference snapshot and generate a view corresponding to the reference snapshot. The view corresponding to the reference snapshot may be referred to as a "reference restoration point."

Backup system 140 includes file system manager 167. In some embodiments, each of the nodes 141, 151, 161 includes a corresponding file system manager 167. In some embodiments, file system manager 167 is a distributed file system manager 167 for nodes 141, 151, 161.

File system manager 167 may be configured to organize in a tree data structure the file system data associated with the CDP-enabled object. An example of the tree data structure is a snapshot tree, which may be based on a B+ tree structure (or other type of tree structure in other embodiments).

In the event the reference snapshot corresponds to all of the object data of one of the one or more CDP-enabled objects hosted by a source system, the view corresponding to the reference snapshot may be comprised of a snapshot tree and one or more object file metadata structures. The snapshot tree may be configured to store the metadata associated with a CDP-enabled object. An object file metadata structure may be configured to store the metadata associated with an object file included in the CDP-enabled object that enables the data chunks associated with the object to be located.

The tree data structure may be used to capture different reference restoration points. The tree data structure allows a chain of reference restoration points to be linked together by allowing a node of a later version of a snapshot tree associated with an intermediate reference restoration point to reference a node of a previous reference restoration point. The previous reference restoration point may correspond to an earlier intermediate reference restoration point or an earlier full reference restoration point. For example, a root node or an intermediate node of a snapshot tree corresponding to the later reference restoration point may reference an intermediate node or leaf node of a snapshot tree corresponding to the earlier reference restoration point.

A snapshot tree is a representation of a fully hydrated restoration point because it provides a complete view of a CDP-enabled object at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, backup system 140 maintains fully hydrated app consistent restoration points. Any file associated with an object at a particular time and the file's contents, for which there is an associated reference restoration point, may be determined from the snapshot tree, regardless if the associated reference restoration was a full reference restoration point or an intermediate reference restoration point.

Backup system 140 may generate a fully hydrated restoration point that corresponds to any point in time for which there is an associated log entry (e.g., a crash consistent restoration point). To generate the fully hydrating restoration point, backup system 140 identifies a closest reference restoration point that occurred before the point in time and applies write IOs included in the log from the closest reference restoration point to the point in time.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., object metadata structure or an object file metadata structure), a pointer to a data chunk stored on the storage cluster, etc.

A metadata structure (e.g., object file metadata structure or object metadata structure) may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of an object or an object file to be linked together by allowing a node of a later version of a metadata structure to reference a node of a previous version of a metadata structure.

A metadata structure may be associated with a plurality of chunk files. A chunk file may be comprised of a plurality of data chunks. Metadata store 164 may store one or more metadata structures. In some embodiments, a metadata structure corresponds to an object. In other embodiments, a metadata structure corresponds to an object file. In other embodiments, a metadata structure corresponds to a portion of an object. In other embodiments, a metadata structure corresponds to a portion of an object file. Metadata store 164 may be a distributed metadata store that is stored in solid state drives 143, 153, 163.

A leaf node of a metadata structure may store a value, such as an identifier of a data brick associated with one or more data chunks. The location of the one or more data chunks associated with a data brick may be identified using one or more data structures (e.g., list, table, etc.) stored in metadata store 164. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Each CDP Service 145, 155, 165 may have a corresponding log. CDP Services 145, 155, 165 may receive a corresponding stream of source system storage changes from a filter daemon, such as filter daemon 134, and store a record of the source system storage changes in its corresponding log. The data associated with a source system storage change may be stored in a storage associated with the CDP Service (e.g., a solid state drive, a hard disk drive, a cache, etc.). A log may include one or more entries. In some embodiments, the log stores one or more entries for a particular CDP-enabled object. In some embodiments, the log stores entries for a plurality of CDP-enabled objects. In some embodiments, a CDP service has a plurality of logs, each log corresponding to a particular CDP-enabled object.

An entry of the log may associate a particular source system storage change associated with a CDP-enabled object with a timestamp and a sequence number. In some embodiments, the entry of the log associates a particular source system storage change associated with a CDP-enabled object with a timestamp, a sequence number, and a snapshot marker. The snapshot marker indicates that a reference restoration point is to be generated. Each entry of the log may store the metadata associated with a particular source system storage change associated with a CDP-enabled object. For example, the metadata associated with a particular source system storage change associated with a CDP-enabled object may include at least one of the following: sequence number, timestamp, IO offset, IO length, IO data bytes, VM universally unique identifier (UUID), VM disk (VMDK) full path on a host at which the VM is running, etc.

When one of the CDP services 145, 155, 165 receives a stream of source system storage changes associated with a CDP-enabled object, the CDP service is configured to replicate the stream of source system storage changes associated with the CDP-enabled object and provide to a remote data recovery system the stream of source system storage changes associated with the CDP-enabled object and backup system 140 is configured to ingest, in parallel, the stream of source system storage changes. The remote data recovery system includes a CDP service that is configured to store the stream of source system storage changes in a log.

Figure 1D:
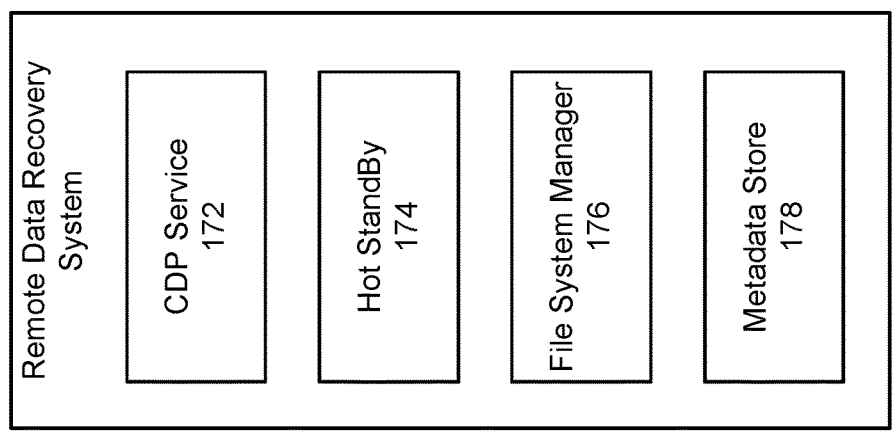
FIG. 1D is a block diagram illustrating a remote data recovery system in accordance with some embodiments.

FIG. 1D is a block diagram illustrating a remote data recovery system in accordance with some embodiments. In some embodiments, remote data recovery system 170 is implemented as remote data recovery system 122. In the example shown, remote data recovery system 170 includes CDP service 172, a hot standby corresponding to a CDP-enabled object 174, file system manager 176, and metadata store 178. In some embodiments, remote data recovery system 170 is implemented in a cloud environment.

Remote data recovery system 170 includes a processor, a memory, and a storage. The storage may be a combination of one or more solid state drives and/or one or more hard disk drive(s). Remote data recovery system may receive from a backup system, such as backup system, 112, one or more instructions to generate a hot standby for a CDP-enabled object. In response to receiving the one or more instructions, a hot standby placeholder object may be generated for the CDP-enabled object. A hot standby placeholder object may be generated for a database, a VM, an application, a container, a pod, etc.

Remote data recovery system 170 is configured to receive data that corresponds to the CDP-enabled object. The data may correspond to a full snapshot of the CDP-enabled object. Remote data recovery system 170 is configured to generate a hot standby corresponding to the CDP-enabled object 174 by using the received data to populate the hot standby placeholder object. In some embodiments, a VM hot standby is generated for the CDP-enabled object. The hot standby 174 is a standby version of at least a portion of the CDP-enabled object hosted on a source system, such as source system 102. The hot standby 174 is a standby version of at least a portion of the CDP-enabled object hosted on the source system however, because there is a delay between a point in time when a write IO is applied to a CDP-enabled object hosted on the source system and a point in time when the write IO is applied to the hot standby 174, hot standby 174 may lag behind the CDP-enabled object hosted on the source system.

The data that corresponds to the full snapshot of the CDP-enabled object is stored in a storage of remote data recovery system 170. In response to receiving the data, file system manager 176 is configured to generate a view corresponding to an initial reference restoration point for the CDP-enabled object. The view corresponding to the initial reference restoration point for the CDP-enabled object may include a tree data structure comprised of a snapshot tree and one or more metadata structures. A tree data structure enables file system manager 176 to locate the data associated with the hot standby 174. Remote data recovery system 170 is configured to store a plurality of tree data structures in metadata store 178, which is stored in a memory or storage of remote data recovery system 170.

A snapshot tree is a representation of a fully hydrated restoration point because it provides a complete view of the CDP-enabled object at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, remote data recovery system 170 is configured to maintain fully hydrated restoration points. Any file associated with the CDP-enabled object at a particular time and the file's contents, for which there is an associated reference restoration point, may be determined from the snapshot tree, regardless if the associated reference restoration was a full reference restoration point or an intermediate reference restoration point.

A snapshot tree may include a root node, one or more levels of one or more intermediate nodes associated with the root node, and one or more leaf nodes associated with an intermediate node of the lowest intermediate level. The root node of a snapshot tree may include one or more pointers to one or more intermediate nodes. Each intermediate node may include one or more pointers to other nodes (e.g., a lower intermediate node or a leaf node). A leaf node may store file system metadata, data associated with a file that is less than a limit size, an identifier of a data brick, a pointer to a metadata structure (e.g., workload metadata structure or a workload file metadata structure), a pointer to a data chunk stored on the storage cluster, etc.

A metadata structure may include a root node, one or more levels of one or more intermediate nodes associated with the root node, and one or more leaf nodes associated with an intermediate node of the lowest intermediate level. The tree data structure associated with a metadata structure allows a chain of metadata structures corresponding to different versions of a CDP-enabled object file to be linked together by allowing a node of a later version of a metadata structure to reference a node of a previous version of a metadata structure.

A metadata structure may be associated with a plurality of chunk files. A chunk file may be comprised of a plurality of data chunks. Metadata store 178 may store one or more metadata structures. In some embodiments, a metadata structure corresponds to an object file. In other embodiments, a metadata structure corresponds to a portion of an object file.

A leaf node of a metadata structure may store a value, such as an identifier of a data brick associated with one or more data chunks. The location of the one or more data chunks associated with a data brick may be identified using one or more data structures (e.g., list, table, etc.) stored in metadata store 178. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

When one of the CDP services of a backup system, such as backup system 112, receives a stream of source system storage changes from a source system, such as source system 102, the CDP service of the backup system is configured to replicate the stream of source system storage changes and provide to remote data recovery system 170 the stream of source system storage changes and the backup system, in parallel, ingests the stream of source system storage changes. CDP service 172 is configured to store the stream of source system storage changes in a log.

File system manager 176 is configured to generate one or more subsequent reference restoration points based on one or more entries and one or more snapshot markers included in the log associated with CDP service 172. File system manager 176 is configured to generate a subsequent reference restoration point by cloning a tree data structure associated with a previous reference restoration point and applying changes indicated by the one or more entries that occurred after the previous reference restoration point and before a snapshot marker that occurred after the previous reference restoration point.

The one or more subsequent reference restoration points generated by remote data recovery system 170 are generated independently from the backup system, such as backup systems 112, 140. This allows remote data recovery system 170 to achieve the specified RPO and/or RTO for a CDP-enabled object because resource constraints associated with a backup system do not influence whether remote data recovery system 170 is able to achieve the specified RPO and/or RTO.

Figure 2A:
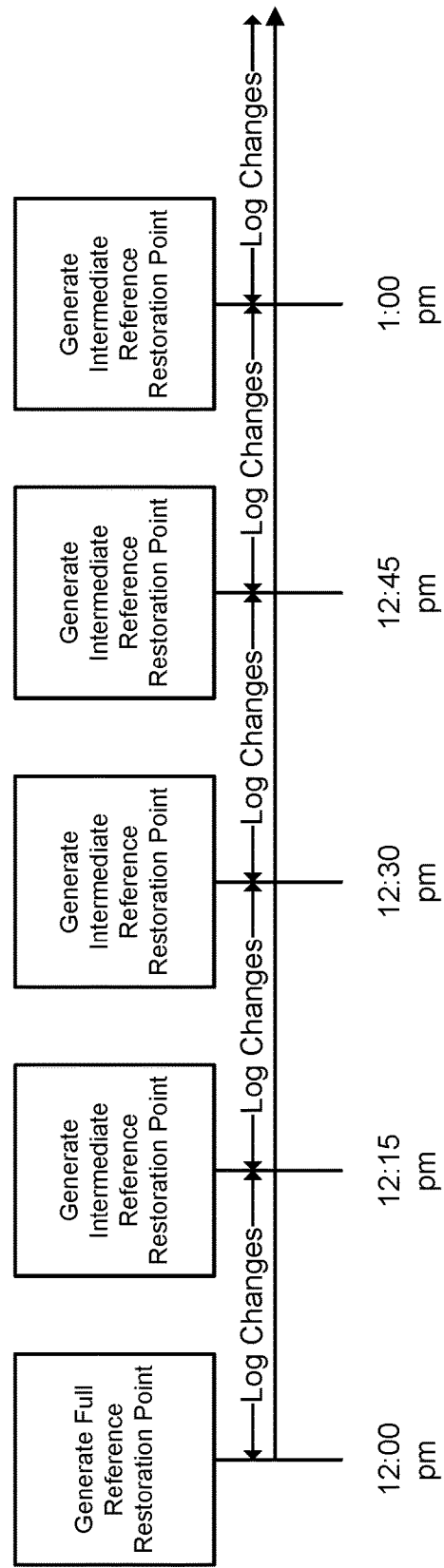
FIG. 2A is an example of a continuous data protection timeline in accordance with some embodiments.

FIG. 2A is an example of a continuous data protection timeline in accordance with some embodiments. In some embodiments, CDP protection timeline 200 corresponds to reference restoration points generated by a backup system, such as backup systems 112, 140. In some embodiments, continuous data protection timeline 200 corresponds to reference restoration points generated by a remote data recovery system, such as remote data recovery systems 122, 170.

In the example shown, CDP timeline 200 illustrates reference restoration points are generated at 12:00 pm, 12:15 pm, 12:30 pm, 12:45 pm, and 1:00 pm. Reference restoration points may be generated based on a backup policy. In some embodiments, the backup policy indicates that reference restoration points are to be generated periodically (e.g., every 15 minutes, every 30 minutes, every 60 minutes, etc.). In some embodiments, the backup policy indicates that reference restoration points are to be generated in response to a user command. In some embodiments, the backup policy indicates that reference restoration points are to be generated after a threshold number of data changes have been logged. In some embodiments, the backup policy indicates that a reference restoration point is to be generated in the event a gap is detected in the sequence of logged IOs.

A backup system, such as backup system 112, and a remote data recovery system, such as remote data recovery system 122, are configured to independently generate reference restoration points based on their corresponding backup policies. The frequency at which reference restoration points are generated by the backup system and the remote data recovery system may be different. For example, a backup policy associated with the backup system may indicate that a reference restoration point is to be generated every 30 minutes while a backup policy associated with the remote data recovery system indicates that a reference restoration point is to be generated every 15 minutes. Thus, the reference restoration points generated by the backup system may be generated at different points in time than the reference restoration points generated by the remote data recovery system.

In the example shown, at 12:00 pm, a full reference restoration point is generated. A full reference restoration point corresponds to a full backup snapshot of a CDP-enabled object. File system data may be ingested and stored by a backup system and/or a remote data recovery system. The backup system and/or remote data recovery system include a file system manager that is configured to organize the file system data in a tree data structure. The tree data structure may be comprised of a snapshot tree and one or more metadata structures.

Between 12:00 pm and 12:15 pm, a write filter associated with a CDP-enabled object hosted on a source system may be configured to stream source system storage changes associated with the CDP-enabled object to a CDP service of the backup system. In response to receiving the stream of source system storage changes, the CDP service is configured to log the stream of source system storage changes. The CDP service of the backup system is configured to replicate the stream of source system storage changes and provide to the remote data recovery system the stream of source system storage changes. The remote data recovery system includes a CDP service that is configured to store the stream of source system storage changes in a log.

At 12:15 pm, an intermediate reference restoration point is generated. The intermediate reference restoration point may be generated by cloning a tree data structure associated with a previous reference restoration point and applying the logged source system storage changes to the cloned tree data structure. In this example, the previous app consistent recovery point corresponds to a full reference restoration point. The intermediate reference restoration point may be generated by cloning a root node of a tree data structure associated with the previous reference restoration point. The cloned tree data structure may be updated, as described herein, based on the logged source system storage changes associated with the CDP-enabled object. The logged source system storage changes associated with the CDP-enabled object that are applied to the tree data structure associated with the previous reference restoration point are the source system storage changes associated with the CDP-enabled object that are logged between 12:00 pm and 12:15 pm.

Between 12:15 pm and 12:30 pm, the write filter associated with the CDP-enabled object hosted on the source system may be configured to provide a stream of source system storage changes associated with the CDP-enabled object to a CDP service of the backup system. In response to receiving the source system storage changes associated with the CDP-enabled object, the CDP service of the backup system is configured to log the source system storage changes associated with the CDP-enabled object, replicate the stream of source system storage changes associated with the CDP-enabled object and provide to the remote data recovery system the stream of source system storage changes associated with the CDP-enabled object and the backup system is configured to ingest, in parallel, the stream of source system storage changes. The remote data recovery system includes a CDP service that is configured to store the stream of source system storage changes associated with the CDP-enabled object in a log.

At 12:30 pm, an intermediate reference restoration point is generated. The intermediate reference restoration point may be generated by the backup system or the remote data recovery system. The intermediate reference restoration point is generated by cloning a tree data structure associated with a previous reference restoration point (e.g., 12:15 pm) and applying the logged source system storage changes associated with the CDP-enabled object to the cloned tree data structure. The logged IOs that are applied to the tree data structure associated with the previous app consistent recovery point are the source system storage changes that are logged between 12:15 pm and 12:30 pm.

Between 12:30 pm and 12:45 pm, source system storage changes associated with the CDP-enabled object are logged by a CDP service and at 12:45 pm, an intermediate reference restoration point is generated. The intermediate reference restoration point may be generated in the same manner as described above.

Between 12:45 pm and 1:00 pm, source system storage changes associated with the CDP-enabled object are logged by a CDP service and at 1:00 pm, an intermediate reference restoration point is generated. The intermediate reference restoration point may be generated in the same manner as described above.

Figure 2B:
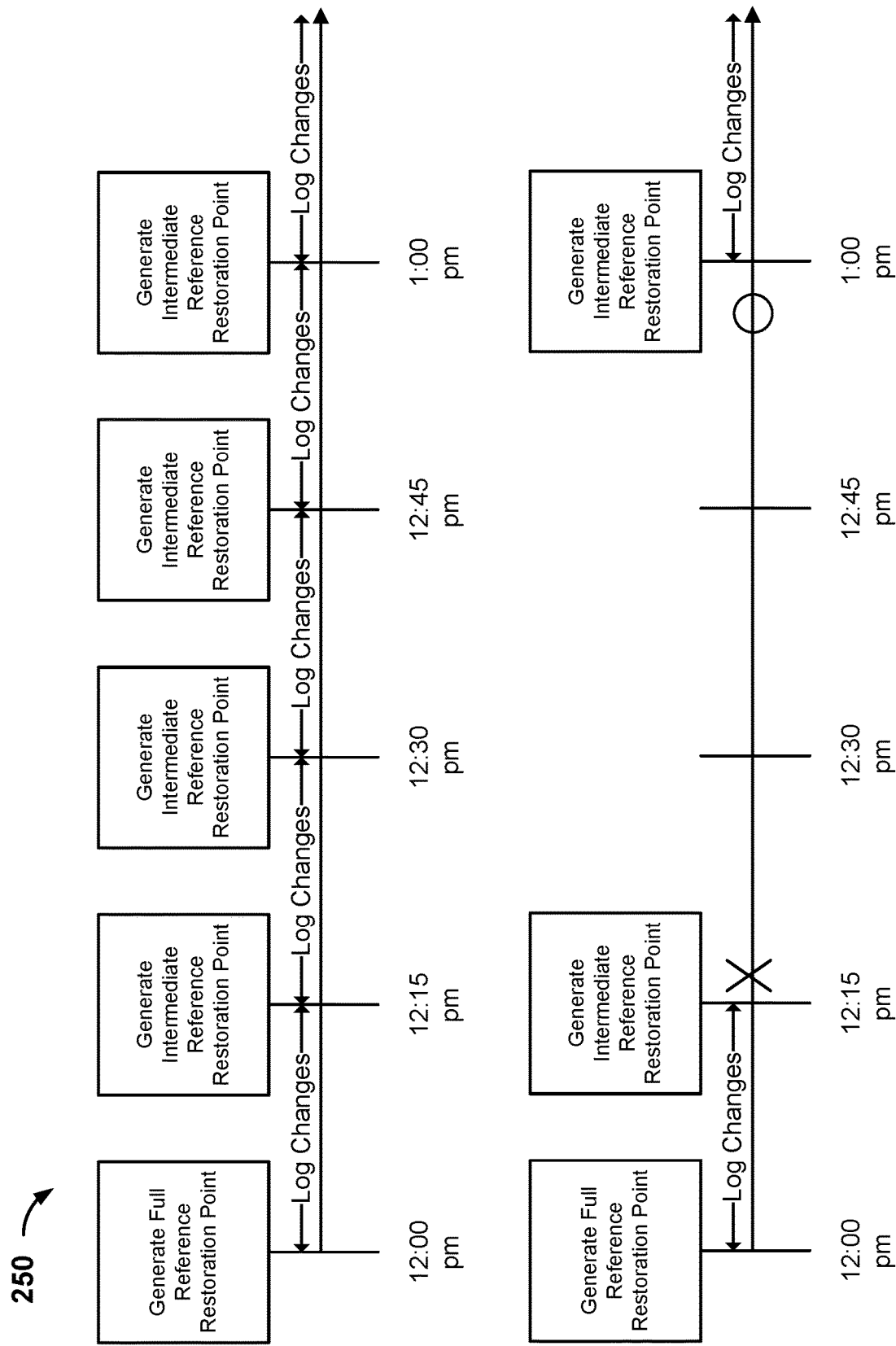
FIG. 2B is an example of a continuous data protection timeline in accordance with some embodiments.

FIG. 2B is an example of a CDP timeline in accordance with some embodiments. In the example shown, an upper timeline shown in FIG. 2B corresponds to the reference restoration points generated by a backup system, such as backup systems 112, 140, and the lower timeline shown in FIG. 2B corresponds to the reference restoration points generated by a remote data recovery system, such as remote data recovery systems 122, 170.

In some embodiments, the remote data recovery system is unsuitable for communications with the backup system. For example, a network connection failure may exist, the remote data recovery system is offline, the remote data recovery system has insufficient resources available to participate in communications with the backup system, the remote data recovery system is scheduled for maintenance, etc.

In the example shown, the remote data recovery system becomes unsuitable for communications with the backup system after 12:15 pm (indicated by an "X"). During this time period, the backup system continues to receive the stream of source system storage changes associated with a CDP-enabled object from the source system and generate one or more reference restoration points for the CDP-enabled object based on the stream of source system storage changes associated with a CDP-enabled object.

At some point in time, the remote data recovery system becomes suitable for communications with the backup system (indicated by an "0"). In the example shown, the remote data recovery system becomes suitable for communications prior to 1:00 pm. A gap exists between a state of a CDP-enabled object hosted on the source system and a state of a hot standby corresponding to the CDP-enabled object hosted on the remote data recovery system.

Other systems may update the hot standby corresponding to the CDP-enabled object by streaming of source system storage changes associated with the CDP-enabled object in sequential order. In the example shown, the changes that occurred from 12:15 pm to 1:00 pm may be streamed, in sequential order, from the backup system to the remote data recovery system. However, this may prevent the specified RPO and/or RTO from being achieved because there may be a large amount of source system storage changes included in the stream.

The backup system may reduce the amount of time needed to update the hot standby corresponding to the CDP-enabled object so that the remote data recovery system is more likely to achieve the specified RPO and/or specified RPO by providing to the remote data recovery system the data changes (e.g., data, metadata, or both) that are not stored by the remote data recovery system that are associated with the closest reference restoration point generated by the backup system prior to the remote data recovery system becoming suitable for communications. In response to receiving the data changes, the remote data recovery system is configured to generate an intermediate reference restoration point by updating the hot standby corresponding to the CDP-enabled object based on the received data changes. In the example shown, the data chunks associated with the intermediate reference restoration point generated at 12:45 pm that are not stored by the remote data recovery system are determined and provided to the remote data recovery system.

After the hot standby corresponding to the CDP-enabled object is updated to a state that corresponds to the closest reference restoration point generated by the backup system prior to the remote data recovery system becoming suitable for communications, the stream of source system storage changes associated with the CDP-enabled object that occurred after the closest reference restoration point generated by the backup system prior to the remote data recovery system becoming suitable for communications (e.g., the changes that occurred between 12:45 pm and 1:00 pm) are provided from the backup system to the remote data recovery system. In response, the remote data recovery system is configured to update the hot standby corresponding to the CDP-enabled object based on the stream of source system storage changes. As a result, the specified RPO and/or RTO associated with the CDP-enabled object is able to be achieved.

Figure 3A:
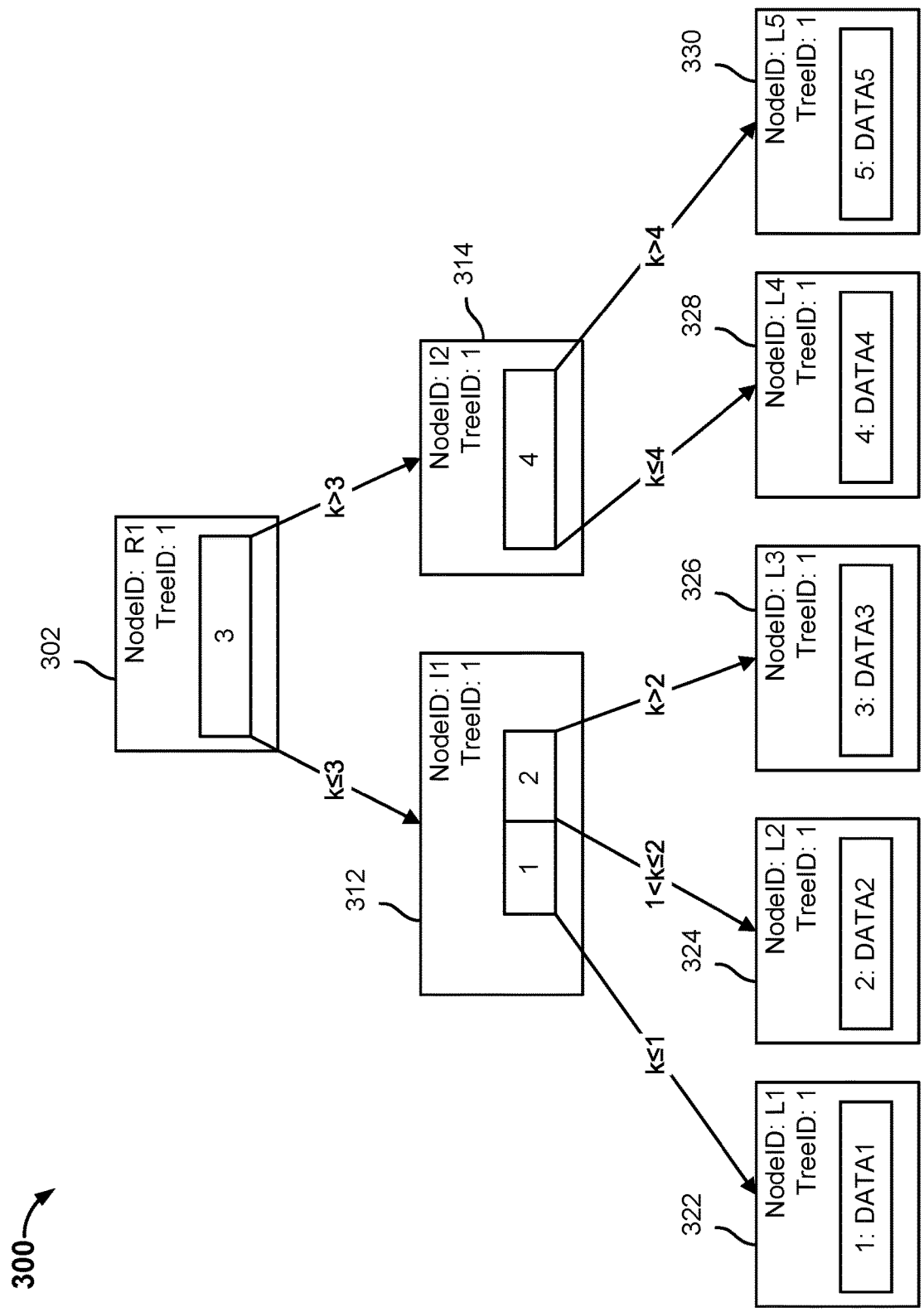
FIG. 3A is a block diagram illustrating an embodiment of a tree data structure.

FIG. 3A is a block diagram illustrating an embodiment of a tree data structure. Tree data structure 300 may be used to represent the file system data associated with a CDP-enabled object that is stored on a backup system, such as backup systems 112, 140 or stored on a remote data recovery system, such as remote data recovery systems 122, 170. A tree data structure enables the stored data associated with a CDP-enabled object to be located. Tree data structure 300 may be generated by a file system manager, such as file system managers 167, 176.

In the example shown, tree data structure 300 corresponds to a snapshot tree. Tree data structure 300 may correspond to a reference snapshot, e.g., a full backup snapshot. Tree data structure 300 may be a view that corresponds to a reference restoration point.

Tree data structure 300 is comprised of a snapshot tree that includes root node 302, intermediate nodes 312, 314, and leaf nodes 322, 324, 326, 328, and 330. Although tree data structure 300 includes one intermediate level between root node 302 and leaf nodes 322, 324, 326, 328, 330, any number of intermediate levels may be implemented. Tree data structure 300 may correspond to a snapshot of file system data associated with a CDP-enabled object at a particular point in time t, such as $t_1$. The snapshot may be received from a source system, such as source systems 102, 130. The snapshot tree in conjunction with a plurality of object metadata structures may provide a complete view of a CDP-enabled object at the particular point in time.

A root node is the starting point of a snapshot tree and may include pointers to one or more other nodes. An intermediate node is a node to which another node points (e.g., root node, other intermediate node) and includes one or more pointers to one or more other nodes. A leaf node is a node at the bottom of a snapshot tree. Each node of the tree structure includes a view identifier of a view with which the node is associated (e.g., TreeID).

A leaf node may be configured to store key-value pairs. A data key k is a lookup value by which a particular leaf node may be accessed. For example, "1" is a data key that may be used to look up "DATA1" of leaf node 322. The data key k may correspond to a brick number of a data brick. A data brick may be comprised of one or more data blocks. In some embodiments, the leaf node is configured to store a brick identifier, file system metadata, object metadata, file size, directory structure, file permissions, physical storage locations of the files, etc. A leaf node may store a pointer to a root node of a metadata structure (e.g., object metadata structure or an object file metadata structure).

A root node or an intermediate node may include one or more node keys. The node key may be an integer value or a non-integer value. Each node key indicates a division between the branches of the node and indicates how to traverse the tree data structure to find a leaf node, i.e., which pointer to follow. For example, root node 302 may include a node key of "3." A data key k of a key-value pair that is less than or equal to the node key is associated with a first branch of the node and a data key k of a key-value pair that is greater than the node key is associated with a second branch of the node.

A data key k of a key-value pair is not limited to a numerical value. In some embodiments, non-numerical data keys may be used for a data key-value pair (e.g., "name," "age," etc.) and a numerical number may be associated with the non-numerical data key. In some embodiments, a hash function may be associated with the non-numerical data key. The hash function may determine which branch of a node with which the non-numerical data key is associated. The hash function is applied to a data key to provide a hash. The hash may determine which branch of a node with which the non-numerical data key is associated.

In the example shown, root node 302 includes a pointer to intermediate node 312 and a pointer to intermediate node 314. Root node 302 includes a NodeID of "R1" and a TreeID of "1." The NodeID identifies the name of the node. The TreeID identifies the view with which the node is associated. When a change is made to data stored in a leaf node as described with respect to FIGS. 3B, 3C, and 3D, the TreeID is used to determine whether a copy of a node is to be made.

Root node 302 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 300 from root node 302 to intermediate node 312 because the data keys have a value that is less than or equal to the node key. Leaf nodes with a data key of "4" or "5" may be found by traversing tree data structure 300 from root node 302 to intermediate node 314 because the data keys have a value that is greater than the node key.

Root node 302 includes a first set of pointers. The first set of pointers associated with a data key less than the node key (e.g., "1," "2," or "3") indicates that traversing tree data structure 300 from root node 302 to intermediate node 312 may lead to a leaf node with a data key of "1," "2," or "3." Intermediate node 314 includes a second set of pointers. The second set of pointers associated with a data key greater than the node key indicates that traversing tree data structure 300 from root node 302 to intermediate node 314 may lead to a leaf node with a data key of "4" or "5."

Intermediate node 312 includes corresponding pointers to leaf nodes 322, 324, 326. Intermediate node 312 includes a NodeID of "I1" and a TreeID of "1." Intermediate node 312 includes a first node key of "1" and a second node key of "2." The data key k for leaf node 322 is a value that is less than or equal to the first node key. The data key k for leaf node 324 is a value that is greater than the first node key and less than or equal to the second node key. The data key k for leaf node 326 is a value that is greater than the second node key. The pointer to leaf node 322 indicates that traversing tree data structure 300 from intermediate node 312 to leaf node 322 may lead to the node with a data key of "1." The pointer to leaf node 324 indicates that traversing tree data structure 300 from intermediate node 312 to leaf node 324 may lead to the node with a data key of "2." The pointer to leaf node 326 indicates that traversing tree data structure 300 from intermediate node 312 to leaf node 326 may lead to the node with a data key of "3."

Intermediate node 314 includes a pointer to leaf node 328 and a pointer to leaf node 330. Intermediate node 314 includes a NodeID of "I2" and a TreeID of "1." Intermediate node 314 includes a node key of "4." The data key k for leaf node 328 is a value that is less than or equal to the node key. The data key k for leaf node 330 is a value that is greater than the node key. The pointer to leaf node 328 indicates that traversing tree data structure 300 from intermediate node 314 to leaf node 328 may lead to the node with a data key of "4." The pointer to leaf node 330 indicates that traversing tree data structure 300 from intermediate node 314 to leaf node 330 may lead to the node with a data key of "5."

Leaf nodes 322, 324, 326, 328, 330 include respective data key-value pairs of "1: DATA1," "2: DATA2," "3: DATA3," "4: DATA4," "5: DATA5." Leaf nodes 322, 324, 326, 328, 330 include respective Node IDs of "L1," "L2," "L3," "L4," "L5." Leaf nodes 322, 324, 326, 328, 330 all include a TreeID of "1." In some embodiments, leaf nodes 322, 324, 326, 328, or 330 are configured to store metadata. In other embodiments, leaf nodes 322, 324, 326, 328, or 330 are configured to store content file data when the size of the content file is less than or equal to a limit size. In other embodiments, leaf nodes 322, 324, 326, 328, or 330 are inodes and are configured to store a pointer to or an identifier of a respective object metadata structure (e.g., object metadata tree).

Figure 3B:
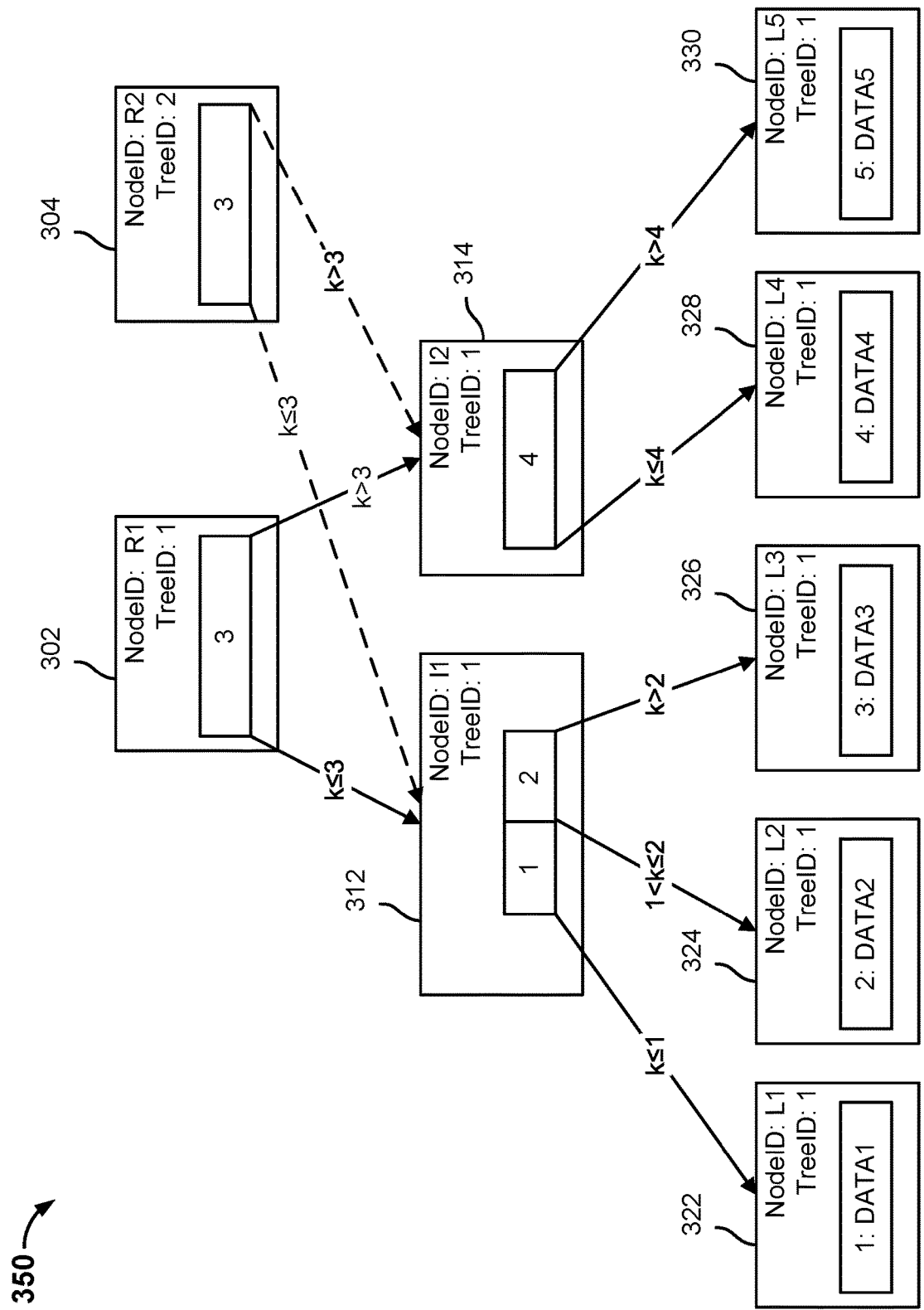
FIG. 3B is a block diagram illustrating an embodiment of a cloned snapshot tree.

FIG. 3B is a block diagram illustrating an embodiment of a cloned snapshot tree. A snapshot tree associated with a previous reference restoration point may be cloned to generate the reference restoration point. A snapshot tree may be cloned when a snapshot tree is added to a tree data structure. In some embodiments, tree data structure 350 may be created by a backup system, such as backup systems 112, 140, or a remote data recovery system, such as remote data recovery systems 122, 170. A CDP service of the backup system or remote data recovery system may store a log for source system storage changes corresponding to the CDP-enabled object. The log may be comprised of a plurality of entries. One of the entries may include a snapshot marker, which indicates that a reference restoration point is to be generated. A file system manager may detect the snapshot marker. In response to detecting the snapshot marker, the file system manager may be configured to generate a reference restoration point by cloning a snapshot tree associated with a previous reference restoration point. In some embodiments, the previous reference restoration point is a full reference restoration point. In some embodiments, the previous reference restoration point is an intermediate reference restoration point.

In the example shown, tree data structure 350 includes root nodes 302, 304, intermediate nodes 312, 314, and leaf nodes 322, 324, 326, 328, and 330. In some embodiments, tree data structure 350 corresponds to a version of a CDP-enabled object at a particular moment in time. The tree data structure can be used to capture different versions of file system data/objects at different moments in time. The tree data structure allows a chain of snapshot trees to be linked together by allowing a node of a later version of a snapshot tree to reference a node of a previous version of a snapshot tree. Each time a reference restoration point is generated, a new root node may be created and the new root node includes the same set of pointers included in the previous root node, that is, the new root node of the snapshot tree may be linked to one or more intermediate nodes associated with a previous snapshot tree. The new root node also includes a different NodeID and a different TreeID. The TreeID may indicate a reference restoration point to which a node is associated. For example, root node 302 with a TreeID of "1" is associated with a first reference restoration point and root node 304 with a TreeID of "2" is associated with a second reference restoration point.

In some embodiments, a root node is associated with a current view. A current view may still accept one or more changes to the data. In the example shown, root node 304 is associated with a current view.

In some embodiments, a root node is associated with a snapshot view. A snapshot view may represent a state of a CDP-enabled object at a particular moment in time in the past and is not updated. In the example shown, root node 302 is associated with a snapshot view of the file system data.

In the example shown, root node 304 is a copy of root node 302. Similar to root node 302, root node 304 includes the same pointers as root node 302. However, root node 304 includes a NodeID of "R2" and a TreeID of "2."

Figure 3C:
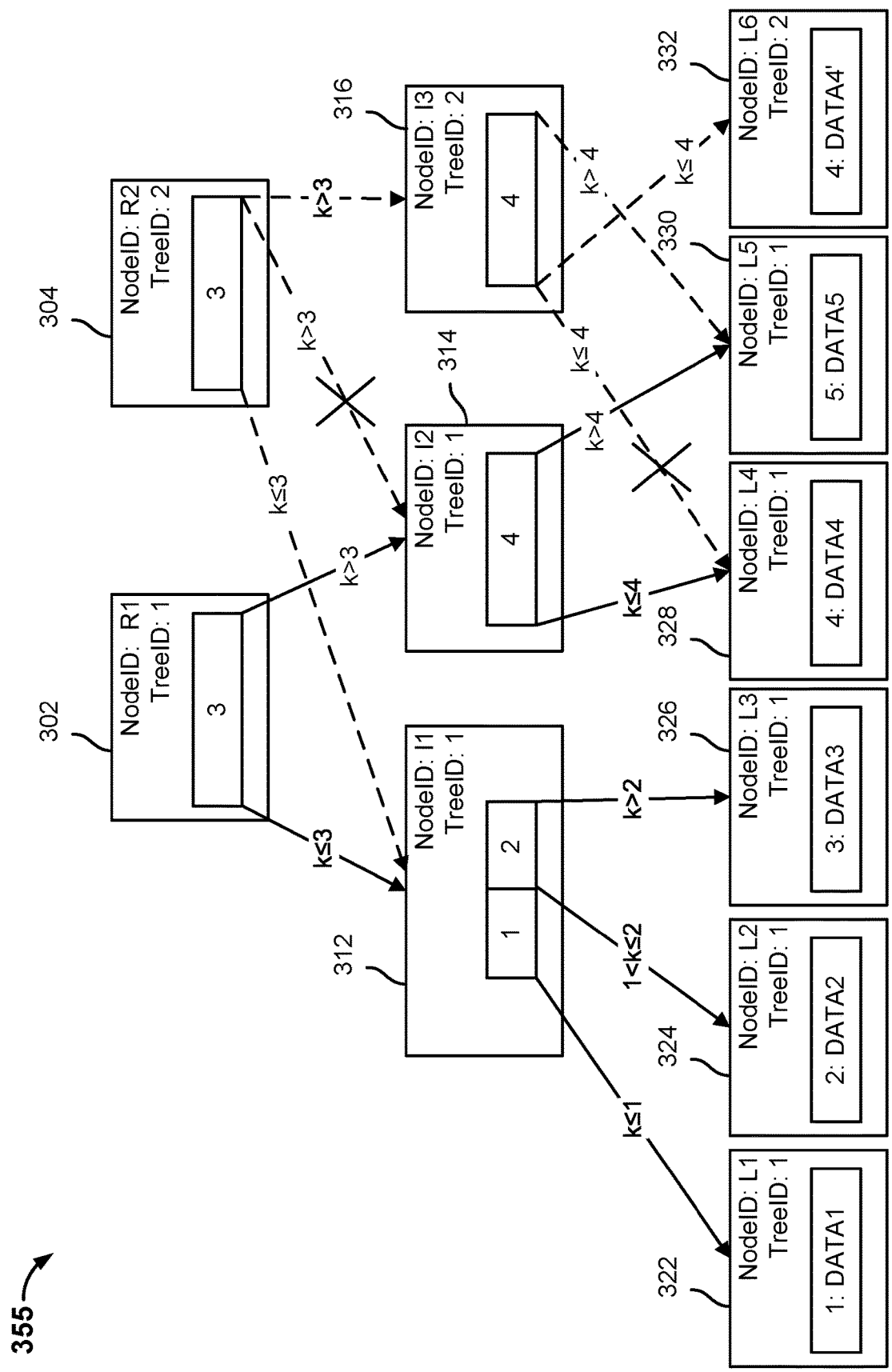
FIG. 3C is a block diagram illustrating an embodiment of modifying a cloned snapshot tree.

FIG. 3C is a block diagram illustrating an embodiment of modifying a cloned snapshot tree. A cloned snapshot tree may be modified to generate a reference restoration point. A CDP service may store a log that includes one or more entries. An entry may be associated with a source system storage change associated with a CDP-enabled object (e.g., an IO that is intercepted from a CDP-enabled object). The IOs associated with the one or more entries may be applied to the cloned snapshot tree to generate a view corresponding to a reference restoration point. In some embodiments, the IOs associated with the one or more entries are applied to the cloned snapshot tree to generate a view corresponding to a specified recovery time point. In some embodiments, the IOs associated with the one or more entries are applied to the cloned snapshot tree to generate a view corresponding to a current state of a cloned hot standby.

In the example shown, tree data structure 355 may be modified by a file system manager, such as file system managers 167, 176. A file system manager may access a log stored by a CDP service and apply to the cloned snapshot tree, the IOs that occurred after the last reference restoration point and before the snapshot marker associated with a current reference restoration point.

In the example shown, a log entry indicates that the value "DATA4" has been modified to be "DATA4'." In some embodiments, the value of a key value pair has been modified. In other embodiments, the value of the key value pair is the data associated with a content file that is smaller than or equal to a limit size. In other embodiments, the value of the key value pair points to a different metadata structure. In some embodiments, the different metadata structure corresponds to a modified version of an object. In some embodiments, the different metadata structure corresponds to a modified version of an object file. The different metadata structure may be a modified version of the metadata structure to which the leaf node previously pointed.

The file system manager starts at root node 304 because that is the root node associated with the cloned snapshot tree. The value "DATA4" is associated with the data key "4." The file system manager traverses snapshot tree 355 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. A shadow copy is a node copy that includes the same pointers as the copied node, but includes a different NodeID and a different TreeID. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node 316 includes the same set of pointers as intermediate node 314, but includes a TreeID of "2" to match the TreeID of root node 204. Intermediate node 316 is a shadow copy of intermediate node 314.

The file system manager updates a pointer of root node 304 to point to intermediate node 316 instead of pointing to intermediate node 314. The file system manager traverses tree data structure 355 from intermediate node 316 to leaf node 328, determines that the TreeID of leaf node 328 does not match the TreeID of root node 304, and creates a copy of leaf node 328. Leaf node copy 332 stores the modified value "DATA4'" and includes the same TreeID as root node 304. The file system manager updates a pointer of intermediate node 316 to point to leaf node 332 instead of pointing to leaf node 328.

In some embodiments, leaf node 332 stores the value of a key value pair that has been modified. In other embodiments, leaf node 332 stores the modified data associated with a content file that is smaller than or equal to a limit size. In other embodiments, leaf node 332 stores a pointer to a metadata structure corresponding to the modified object. In other embodiments, leaf node 332 stores a pointer to a metadata tree corresponding to the modified object file.

Figure 3D:
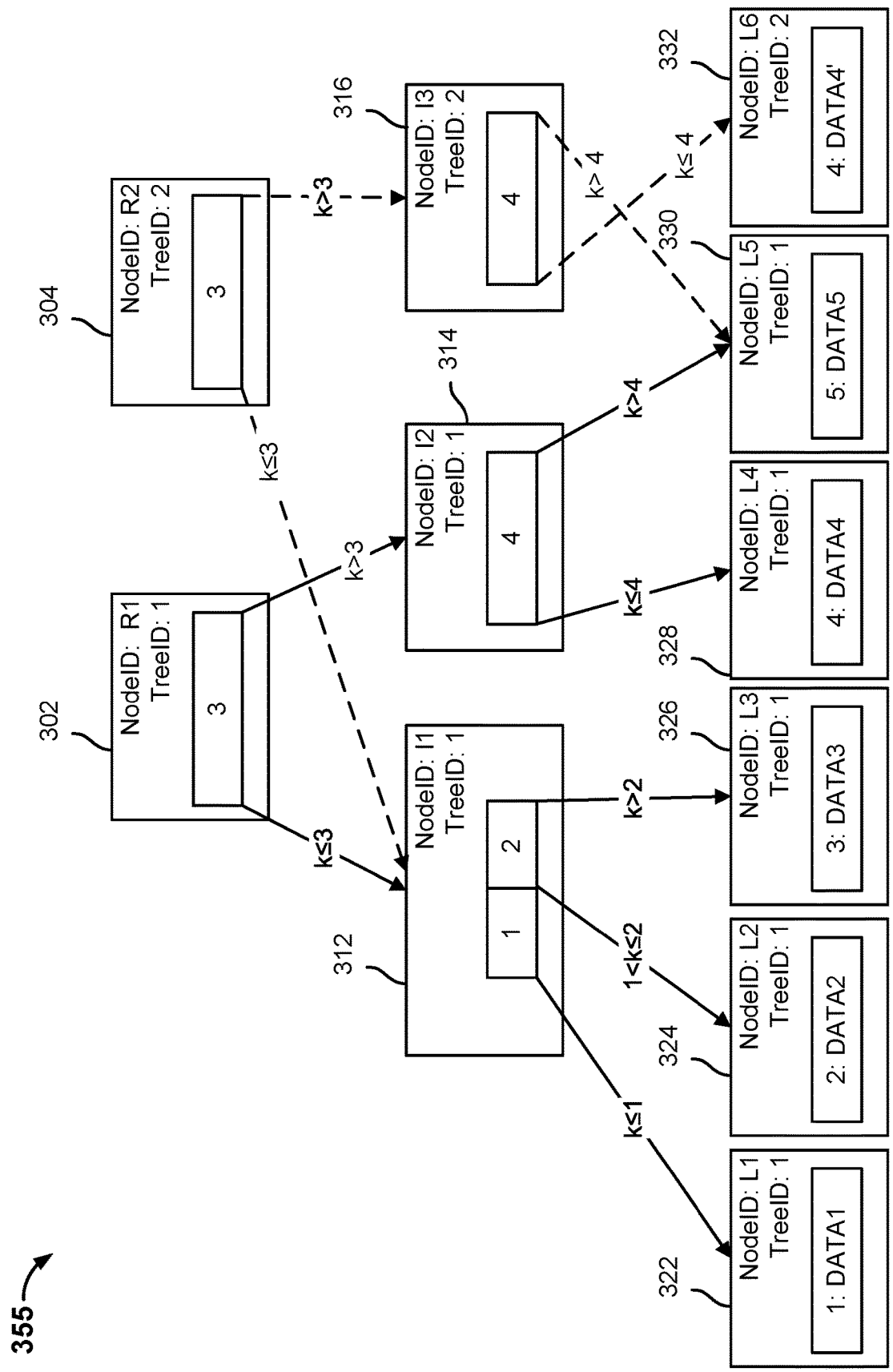
FIG. 3D is a block diagram illustrating an embodiment of a modified cloned snapshot tree.

FIG. 3D is a block diagram illustrating an embodiment of a modified cloned snapshot tree. Tree data structure 355 shown in FIG. 3D illustrates a result of the modifications made to a snapshot tree as described with respect to FIG. 3C. The snapshot tree with root node 302 may correspond to a first reference restoration point and the snapshot tree with root node 304 may correspond to a second reference restoration point. In this example, both snapshot trees are fully hydrated restoration points. A fully hydrated restoration point corresponds to a state which may be restored without having to apply one or more logged IOs. For example, a CDP-enabled object may be restored to a state associated with time $t_1$ by traversing the snapshot tree having root node 302. A CDP-enabled object may be restored to a state associated with time $t_{10}$ by traversing the snapshot tree having root node 304. A CDP-enabled object may be restored to a state between time $t_1$ and $t_{10}$ by applying one or more data changes that are stored in a log file to the snapshot tree having root node 302 and then traversing the modified snapshot tree.

Figure 4A:
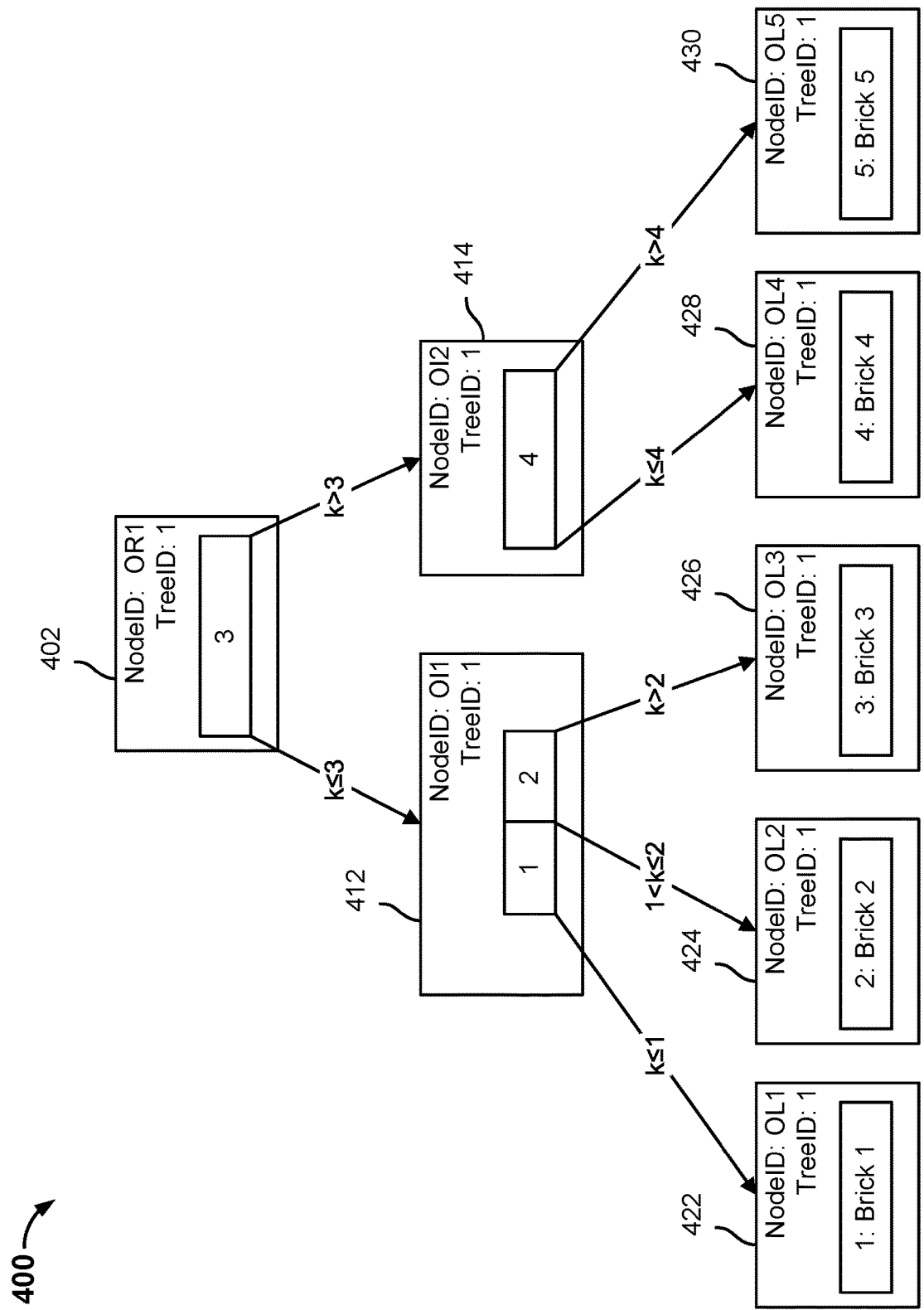
FIG. 4A is a block diagram illustrating an embodiment of a tree data structure.

FIG. 4A is a block diagram illustrating an embodiment of a tree data structure. In some embodiments, tree data structure 400 may be created by a backup system, such as backup systems 112, 140 or a remote data recovery system, such as remote data recovery systems 122, 170. In the example shown, tree data structure 400 corresponds to a file associated with CDP-enabled object and stores the metadata for the file associated with the CDP-enabled object. A leaf node of a snapshot tree, such as a leaf node of tree data structures 300, 350, 355, may include a pointer to root node of a tree data structure for a file associated with the CDP-enabled object, such as tree data structure 400.

A tree data structure corresponding to a CDP-enabled object file is a metadata structure, but is used to organize the data chunks associated with the CDP-enabled object file that are stored on the backup system or the remote data recovery system. Tree data structure 400 may be referred to as a "metadata structure" or a "metadata tree."

A tree data structure corresponding to object file at a particular point in time (e.g., a particular version) may be comprised of a root node, one or more levels of one or more intermediate nodes, and one or more leaf nodes. In some embodiments, a tree data structure corresponding to an object file is comprised of a root node and one or more leaf nodes without any intermediate nodes. Tree data structure 400 may be a reference restoration point of an object file at a particular point in time t, for example at time $t_1$.

In the example shown, tree data structure 400 includes an object root node 402, object intermediate nodes 412, 414, and object leaf nodes 422, 424, 426, 428, 430. Although tree data structure 400 includes one intermediate level between root node 402 and leaf nodes 422, 424, 426, 428, 430, any number of intermediate levels may be implemented. Similar to the snapshot trees described above, each node includes a "NodeID" that identifies the node and a "TreeID" that identifies a view with which the node is associated.

In the example shown, root node 402 includes a pointer to intermediate node 412 and a pointer to intermediate node 414. Root node 402 includes a NodeID of "OR1" and a TreeID of "1."

In the example shown, intermediate node 412 includes corresponding pointers to leaf nodes 422, 424, 426. Intermediate node 412 includes a NodeID of "OI1" and a TreeID of "1." Intermediate node 412 includes a first node key and a second node key. The data key k for leaf node 422 is a value that is less than or equal to the first node key. The data key for leaf node 424 is a value that is greater than the first node key and less than or equal to the second node key. The data key for leaf node 426 is a value that is greater than the second node key. The pointer to leaf node 422 indicates that traversing tree data structure 400 from intermediate node 412 to leaf node 422 may lead to the node with a data key of "1." The pointer to leaf node 424 indicates that traversing tree data structure 400 from intermediate node 412 to leaf node 424 may lead to the node with a data key of "2." The pointer to leaf node 426 indicates that traversing tree data structure 400 from intermediate node 412 to leaf node 426 may lead to the node with a data key of "3."

In the example shown, intermediate node 414 includes a pointer to leaf node 428 and a pointer to leaf node 430. Intermediate node 414 includes a NodeID of "OI2" and a TreeID of "1." Intermediate node 414 includes a node key. The data key k for leaf node 428 is a value that is less than or equal to the node key. The data key for leaf node 430 is a value that is greater than the node key. The pointer to leaf node 428 indicates that traversing tree data structure 400 from intermediate node 414 to leaf node 428 may lead to the node with a data key of "4." The pointer to leaf node 430 indicates that traversing tree data structure 400 from intermediate node 414 to leaf node 430 may lead to the node with a data key of "5."

Leaf node 422 includes a data key-value pair of "1: Brick 1." "Brick 1" is a brick identifier that identifies the data brick that is associated with one or more data chunks of an object file. Leaf node 422 includes NodeID of "OL1" and a TreeID of "1." To view the value associated with a data key of "1," tree data structure 400 is traversed from root node 402 to intermediate node 412 to leaf node 422.

Leaf node 424 includes a data key-value pair of "2: Brick 2." "Brick 2" is a brick identifier that identifies the data brick that is associated with one or more data chunks of an object file. Leaf node 424 includes NodeID of "OL2" and a TreeID of "1." To view the value associated with a data key of "2," tree data structure 400 is traversed from root node 402 to intermediate node 412 to leaf node 424.

Leaf node 426 includes a data key-value pair of "3: Brick 3." "Brick 3" is a brick identifier that identifies the data brick that is associated with one or more data chunks of an object file. Leaf node 426 includes NodeID of "OL3" and a TreeID of "1." To view the value associated with a data key of "3," tree data structure 400 is traversed from root node 402 to intermediate node 412 to leaf node 426.

Leaf node 428 includes a data key-value pair of "4: Brick 4." "Brick 4" is a brick identifier that identifies the data brick that is associated with one or more data chunks of an object file. Leaf node 428 includes NodeID of "OL4" and a TreeID of "1." To view the value associated with a data key of "4," tree data structure 400 is traversed from root node 402 to intermediate node 414 to leaf node 428.

Leaf node 430 includes a data key-value pair of "5: Brick 5." "Brick 5" is a brick identifier that identifies the data brick that is associated with one or more data chunks of an object file. Leaf node 430 includes NodeID of "OL5" and a TreeID of "1." To view the value associated with a data key of "5," tree data structure 400 is traversed from root node 402 to intermediate node 414 to leaf node 430.

An object file may be comprised of a plurality of data chunks. A brick may be associated with one or more data chunks. In the example shown, leaf nodes 422, 424, 426, 428, 430 each store a corresponding brick identifier. The location of the one or more data chunks associated with a data brick may be identified using one or more data structures (e.g., list, table, etc.) stored in a metadata store. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1 hash value). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

Figure 4B:
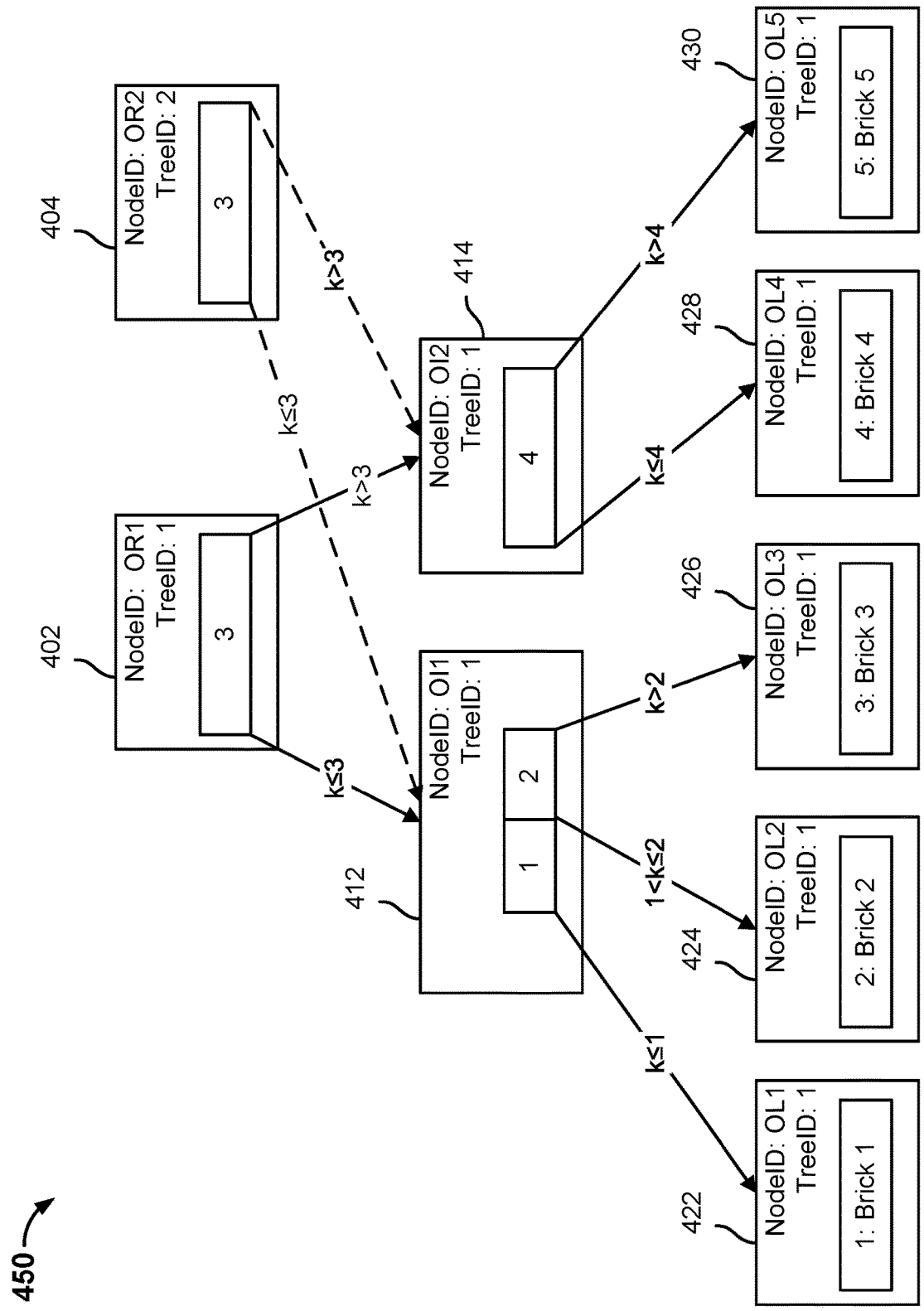
FIG. 4B is a block diagram illustrating an embodiment of a cloned metadata structure.

FIG. 4B is a block diagram illustrating an embodiment of a cloned metadata structure. A snapshot tree corresponding to an object file may be cloned to generate the reference restoration point. In some embodiments, tree data structure 450 may be created by a backup system, such as backup systems 112, 140, or a remote data recovery system, such as remote data recovery systems 122, 170. A CDP service of the backup system or the remote data recovery system may store a log for a plurality of source system storage changes associated with a CDP-enabled object. The log may be comprised of a plurality of entries for an object file associated with the CDP-enabled object. One of the entries may include a snapshot marker, which indicates that a reference restoration point is to be generated. A file system manager of the backup system may detect the snapshot marker and in response, generate a reference restoration point by cloning a snapshot tree associated with a previous reference restoration point. In some embodiments, the previous reference restoration point corresponds to a full reference restoration point of an object or object file. In some embodiments, the previous reference restoration point corresponds to an intermediate reference restoration point.

In the example shown, tree data structure 450 includes a first metadata structure comprising root node 402, intermediate nodes 412, 414, and leaf nodes 422, 424, 426, 428, and 430. Tree data structure 450 also includes a second metadata structure that may be a snapshot of a file associated with a CDP-enabled object at a particular point in time t+n, for example at time $t_{10}$. The second metadata structure is comprised of root node 404, intermediate nodes 412, 414, and leaf nodes 422, 424, 426, 428, and 430. To create a reference restoration point of the object file, a new root node is created. The new root node is a copy of the root node associated with the previous reference restoration point of the object or object file and includes the same set of pointers as the copied root node.

In the example shown, root node 404 is a copy of root node 402 and includes a set of pointers to intermediate nodes 412, 414, which are intermediate nodes associated with a previous reference restoration point. In some embodiments, root node 404 is associated with a current view. Root node 404 is a copy of root node 402 and includes a first set of pointers to intermediate node 412 and a second set of pointers to intermediate node 414.

Figure 4C:
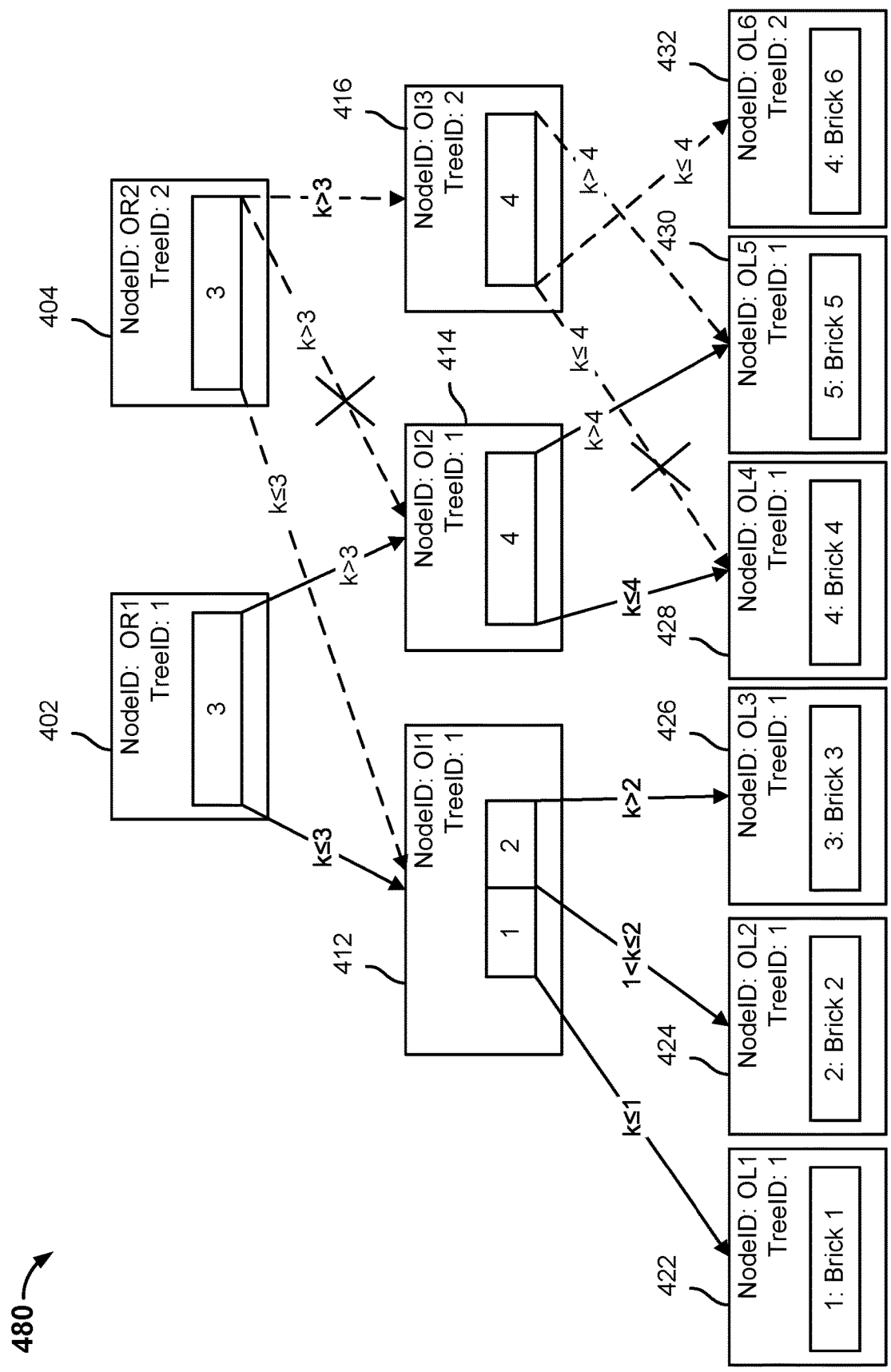
FIG. 4C is a block diagram illustrating an embodiment of modifying a cloned metadata structure.

FIG. 4C is a block diagram illustrating an embodiment of modifying a cloned metadata structure. A cloned metadata structure may be generated to generate an app consistent recovery point or a crash consistent recovery point. A CDP service may store a log that includes one or more entries. An entry may be associated with an IO that is intercepted from a CDP-enabled object. The IOs associated with the one or more entries may be applied to the cloned metadata structure to generate the reference restoration point of an object file associated with the CDP-enabled object. In some embodiments, the IOs associated with the one or more entries are applied to the cloned metadata structure to generate a view corresponding to a specified recovery time point of an object file associated with the CDP-enabled object. In some embodiments, the IOs associated with the one or more entries are applied to the cloned metadata structure to generate a view corresponding to a current state of a cloned hot standby that corresponds to an object file associated with the CDP-enabled object.

In the example shown, tree data structure 480 may be modified by a file system manager, such as file system managers 167, 176. A metadata structure with root node 404 may be a current view.

In some embodiments, the object data may be modified such that one of the data chunks is replaced by another data chunk. When a data chunk of object data associated with a previous reference restoration point is replaced with a new data chunk, the data brick associated with the new data chunk may be different. A leaf node of a metadata structure stores a brick identifier associated with a particular brick associated with the data chunk. To represent this modification to the file data, a corresponding modification is made to a current view of a metadata structure. The current view of the metadata structure is modified because the previous metadata structure is a snapshot view and can no longer be modified. The data chunk of the object data that was replaced has a corresponding leaf node in the previous metadata structure. A new leaf node in the current view of the metadata structure is created, as described herein, that corresponds to the new data chunk. The new leaf node includes an identifier associated with the new reference restoration point. The new leaf node may also store the chunk identifier associated with the modified data chunk.

In the example shown, a data chunk included in "Brick 4" has been replaced with a data chunk associated with "Brick 6." The file system manager starts at root node 404 because that is the root node corresponding to the reference restoration point at time $t_{10}$. The value "Brick 4" is associated with the data key "4." The file system manager traverses tree data structure 480 from root node 404 until it reaches a target node, in this example, leaf node 428. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 404 and proceeds to intermediate node 414. The file system manager compares the TreeID of intermediate node 414 with the TreeID of root node 404, determines that the TreeID of intermediate node 414 does not match the TreeID of root node 404, and creates a copy of intermediate node 414. Intermediate node copy 416 is a shadow copy and includes the same set of pointers as intermediate node 414, but includes a TreeID of "2" to match the TreeID of root node 404. The file system manager updates a pointer of root node 404 to point to intermediate node 416 instead of pointing to intermediate node 414. The file system manager traverses tree data structure 480 from intermediate node 416 to leaf node 428, determines that the TreeID of leaf node 428 does not match the TreeID of root node 404, and creates a copy of leaf node 428. Leaf node 432 is a copy of leaf node 428, but stores the brick identifier "Brick 6" and includes the same TreeID as root node 404. The file system manager updates a pointer of intermediate node 416 to point to leaf node 432 instead of pointing to leaf node 428.

Figure 4D:
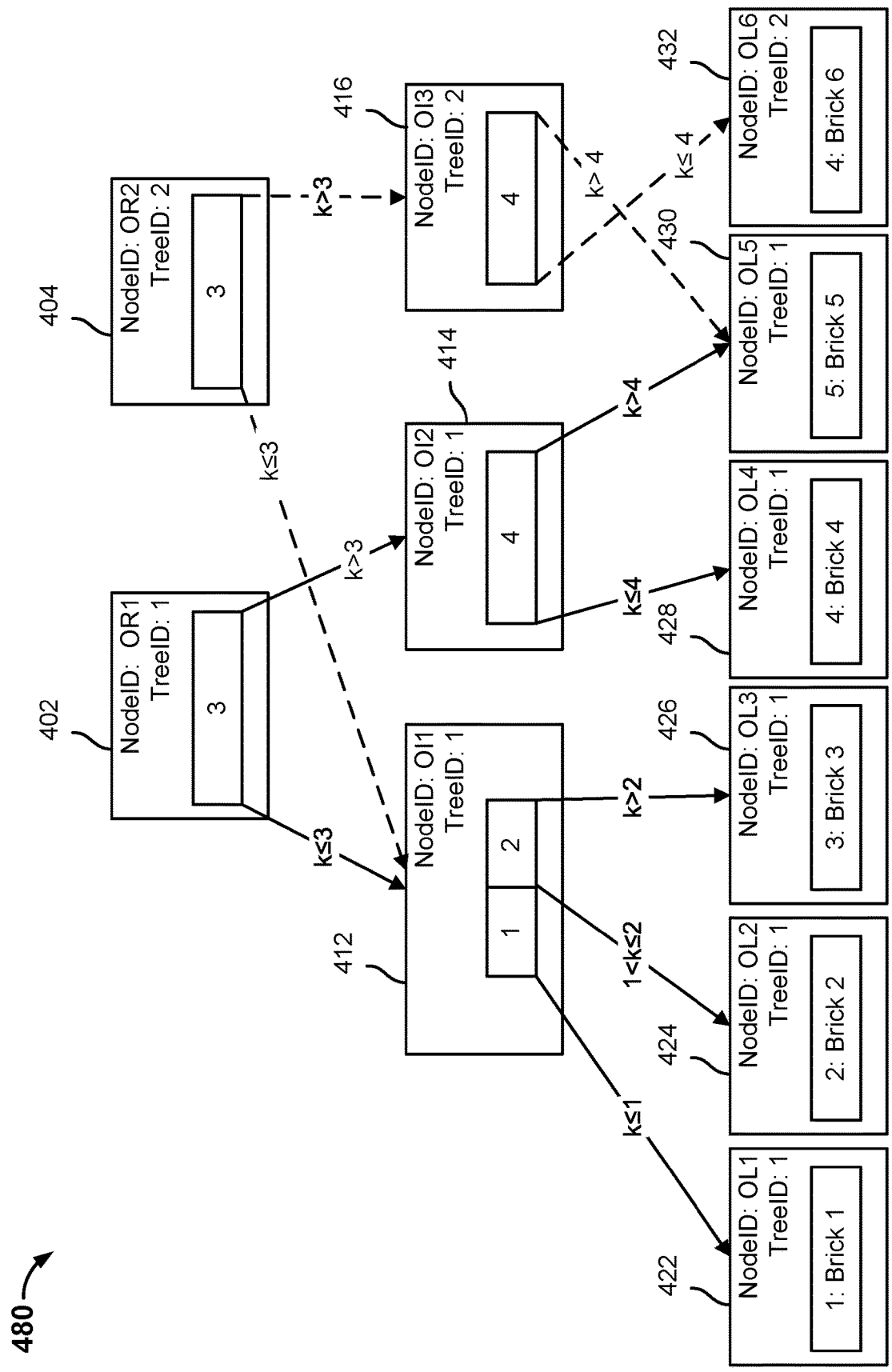
FIG. 4D is a block diagram illustrating an embodiment of a modified cloned metadata structure.

FIG. 4D is a block diagram illustrating an embodiment of a modified cloned metadata structure. The metadata tree 480 shown in FIG. 4D illustrates a result of the modifications made to file metadata tree 480 as described with respect to FIG. 4C.

The metadata structure with root node 402 may correspond to a first reference restoration point of an object file associated with a CDP-enabled object and the snapshot tree with root node 404 may correspond to a second reference restoration point of the object file associated with the CDP-enabled object. In this example, both metadata structures are fully hydrated restoration points. A fully hydrated restoration point corresponds to a state which may be restored without having to apply one or more logged IOs. For example, an object file may be restored to a state associated with time $t_1$ by traversing the metadata structure having root node 402. An object file may be restored to a state associated with time $t_{10}$ by traversing the metadata structure having root node 404. An object or an object file may be restored to a state between time $t_1$ and $t_{10}$ by applying one or more data changes that are stored in a log file to the metadata structure having root node 402 and then traversing the modified snapshot tree.

Figure 5:
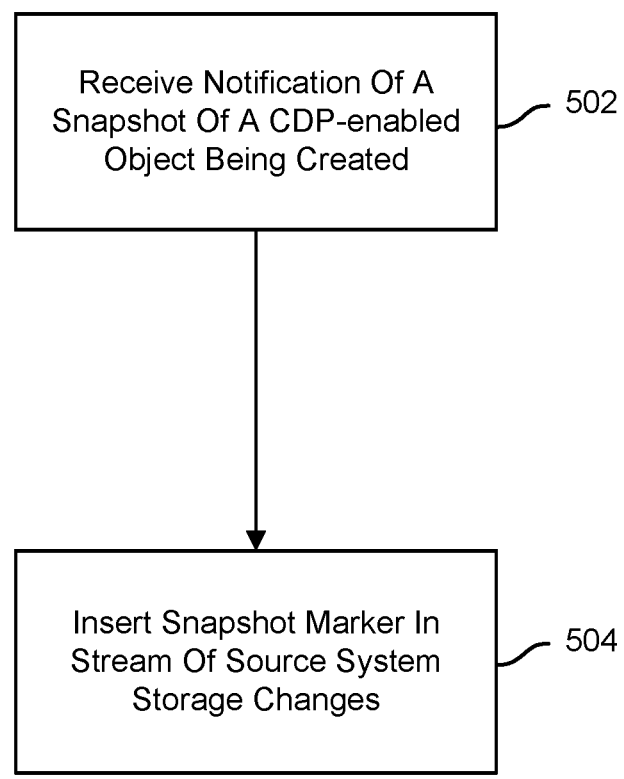
FIG. 5 is a flow chart illustrating a process of providing a reference restoration point in accordance with some embodiments.

FIG. 5 is a flow chart illustrating a process of providing a reference restoration point in accordance with some embodiments. In some embodiments, process 500 is implemented by a write filter, such as write filter 105.

At 502, a notification of a snapshot of a CDP-enabled object being created is received. The notification may be received from a CDP-enabled object. The CDP-enabled object may include a backup agent that notifies a write filter.

At 504, a snapshot marker is inserted in the stream of source system storage changes associated with the CDP-enabled object. The snapshot marker may be inserted in the stream of data in between intercepted write IOs. In some embodiments, the backup agent may provide to a CDP-enabled object a command to quiesce or stun the CDP-enabled object for a short period of time (e.g., 1 second). The snapshot marker may correspond to a point in time at which the CDP-enabled object is quiesced. The snapshot marker may include a timestamp that indicates a reference restoration point is associated with CDP-enabled object to which the write filter is attached.

Figure 6:
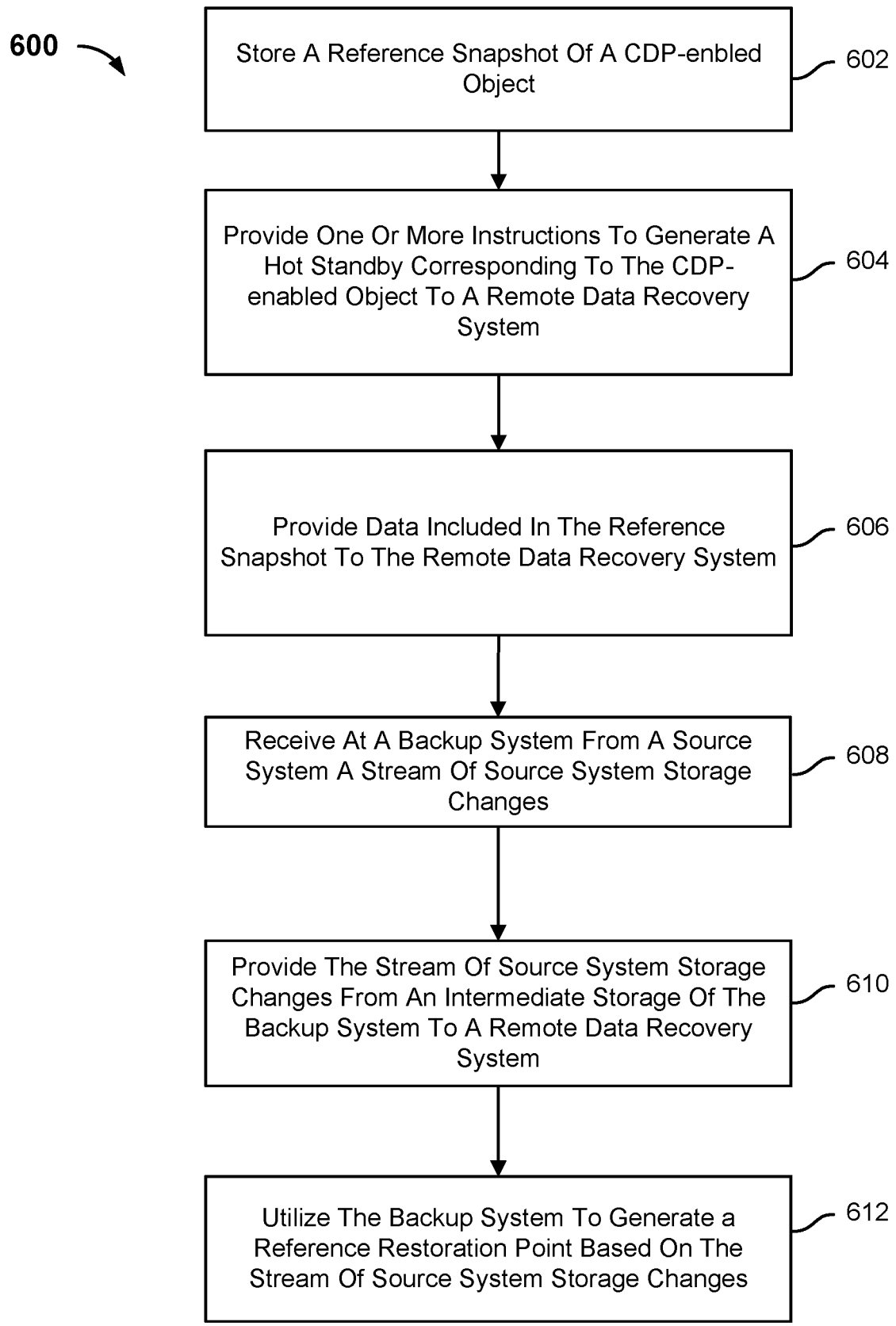
FIG. 6 is a flow diagram illustrating an embodiment of a process for updating a hot standby corresponding to a CDP-enabled object.

FIG. 6 is a flow diagram illustrating an embodiment of a process for updating a hot standby corresponding to a CDP-enabled object. In the example shown, process 600 may be implemented by a backup system, such as backup systems 112, 140.

At 602, a reference snapshot of a CDP-enabled object is stored. A reference snapshot may correspond to a full backup snapshot and include content associated with the CDP-enabled object. The content associated with the CDP-enabled object may include object data. In some embodiments, the reference snapshot of the CDP-enabled object corresponds to an initial full backup snapshot of a CDP-enabled object. In some embodiments, the reference snapshot of the CDP-enabled object corresponds to a subsequent full backup snapshot of the CDP-enabled object. A subsequent full backup snapshot may be performed in the event a gap in a sequence of IOs associated with the CDP-enabled object is detected.

A backup system may ingest the data included in the reference snapshot and generate a tree data structure for the CDP-enabled object. In some embodiments, the tree data structure includes a snapshot tree for the CDP-enabled object and one or more metadata structures that corresponding to one or more object files associated with the CDP-enabled object. The tree data structure corresponding to the reference snapshot may be a reference restoration point for the CDP-enabled object.

At 604, one or more instructions to generate a hot standby corresponding to the CDP-enabled object are provided to a remote data recovery system. The one or more instructions may include a command to generate a hot standby. The instructions may be provided using one or more APIs associated with an application (e.g., VMWare) that is configured to generate a hot standby. In response to receiving the one or more instructions, the remote data recovery system may generate a hot standby placeholder object for the CDP-enabled object. In some embodiments, a hot standby placeholder object is generated for a database. In some embodiments, a hot standby placeholder object is generated for a VM (e.g., VM configuration file that describes a VM).

At 606, data included in the reference snapshot is provided to the remote data recovery system. The provided data includes the content associated with the CDP-enabled object. In response to receiving the data, the remote data recovery system is configured to generate the hot standby corresponding to the CDP-enabled object by populating the hot standby placeholder object based on the received data. The hot standby corresponding to the CDP-enabled object may be used for failover purposes in the event the CDP-enabled object hosted on the source system goes offline.

At 608, a stream of source system storage changes is received at a backup system from a source system. The backup system is configured to store the stream of source system storage changes in an intermediate storage.

At 610, the stream of source system storage changes is provided from the intermediate storage of the backup system to the remote data recovery system. The CDP service of the backup system is configured to replicate the stream of source system storage changes and provide to the remote data recovery system the stream of source system storage changes and the backup system is configured to ingest, in parallel, the stream of source system storage changes. The remote data recovery system includes a CDP service that is configured to store the stream of source system storage changes in a log.

The remote data recovery system is configured to generate one or more subsequent reference restoration points based on one or more entries and one or more snapshot markers included in the log.

At 612, the backup system is utilized to generate a reference restoration point based on the stream of source system storage changes. The CDP service of the backup system stores one or more entries and a snapshot marker. The backup system is configured to generate a reference restoration point by cloning a tree data structure associated with a previous reference restoration point and applying changes indicated by the one or more entries that occurred after the previous reference restoration point and before the snapshot marker. The generated reference restoration point may be used by the backup system to restore to the source system a CDP-enabled object in the event the CDP-enabled object hosted on the source system goes offline.

Figure 7:
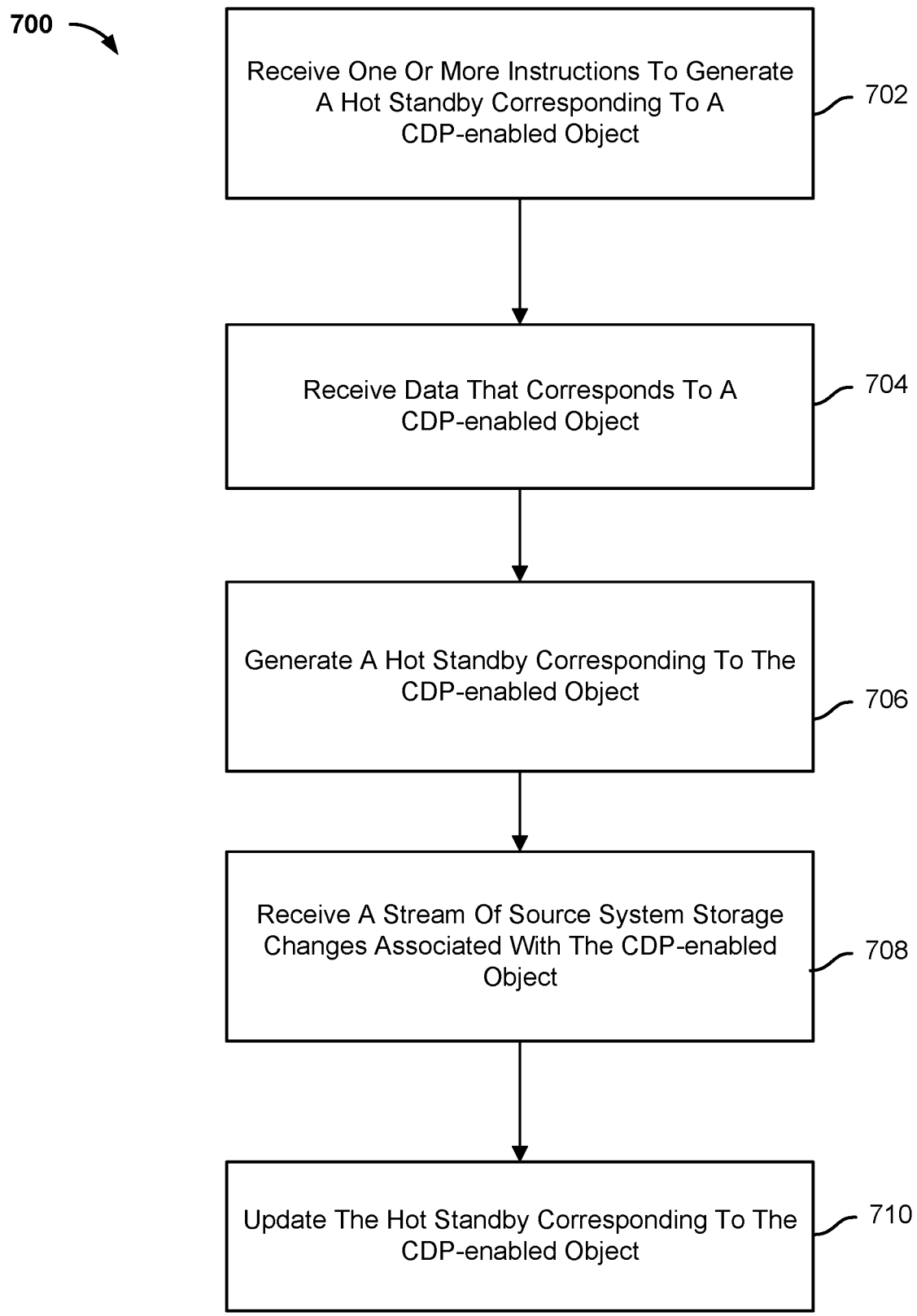
FIG. 7 is a flow diagram illustrating an embodiment of a process for generating and maintaining a hot standby in accordance with some embodiments.

FIG. 7 is a flow diagram illustrating an embodiment of a process for generating and maintaining a hot standby in accordance with some embodiments. In the example shown, process 700 may be implemented by a remote data recovery system, such as remote data recovery systems 122, 170.

At 702, one or more instructions to generate a hot standby corresponding to a CDP-enabled object are received. In response to receiving the one or more instructions, a hot standby placeholder object may be generated for the CDP-enabled object. In some embodiments, a hot standby placeholder object is generated for a database. In some embodiments, a hot standby placeholder object is generated for a VM.

At 704, data that corresponds to the CDP-enabled object is received. The data that corresponds to a CDP-enabled object hosted on a source system may be received at a recovery data recovery system from a backup system. The data corresponds to a full snapshot of the CDP-enabled object.

At 706, a hot standby corresponding to the CDP-enabled object is generated based on the received data. The received data is used to populate the hot standby placeholder object. In some embodiments, a VM hot standby is generated for the CDP-enabled object. The hot standby is a standby version of at least a portion of the CDP-enabled object hosted on the source system. The hot standby is a standby version of at least a portion of the CDP-enabled object hosted on the source system however, because there is a delay between a point in time when a write IO is applied to a CDP-enabled object hosted on the source system and a point in time when the write IO is applied to the hot standby, the hot standby may lag behind the CDP-enabled object hosted on the source system. In some embodiments, a hot standby placeholder object is generated for a database.

At 708, a stream of source system storage changes associated with the CDP-enabled object is received. A CDP service of the backup system receives the stream of source system storage changes from the source system, replicates the stream of source system storage changes, and provides the stream of source system storage changes to the remote data recovery system. The remote data recovery system includes a CDP service that is configured to store the stream of source system storage changes in a log.

At 710, the hot standby corresponding to the CDP-enabled object is updated. The CDP service is configured to update the hot standby corresponding to the CDP-enabled object based on the stream of source system storage changes.

Figure 8:
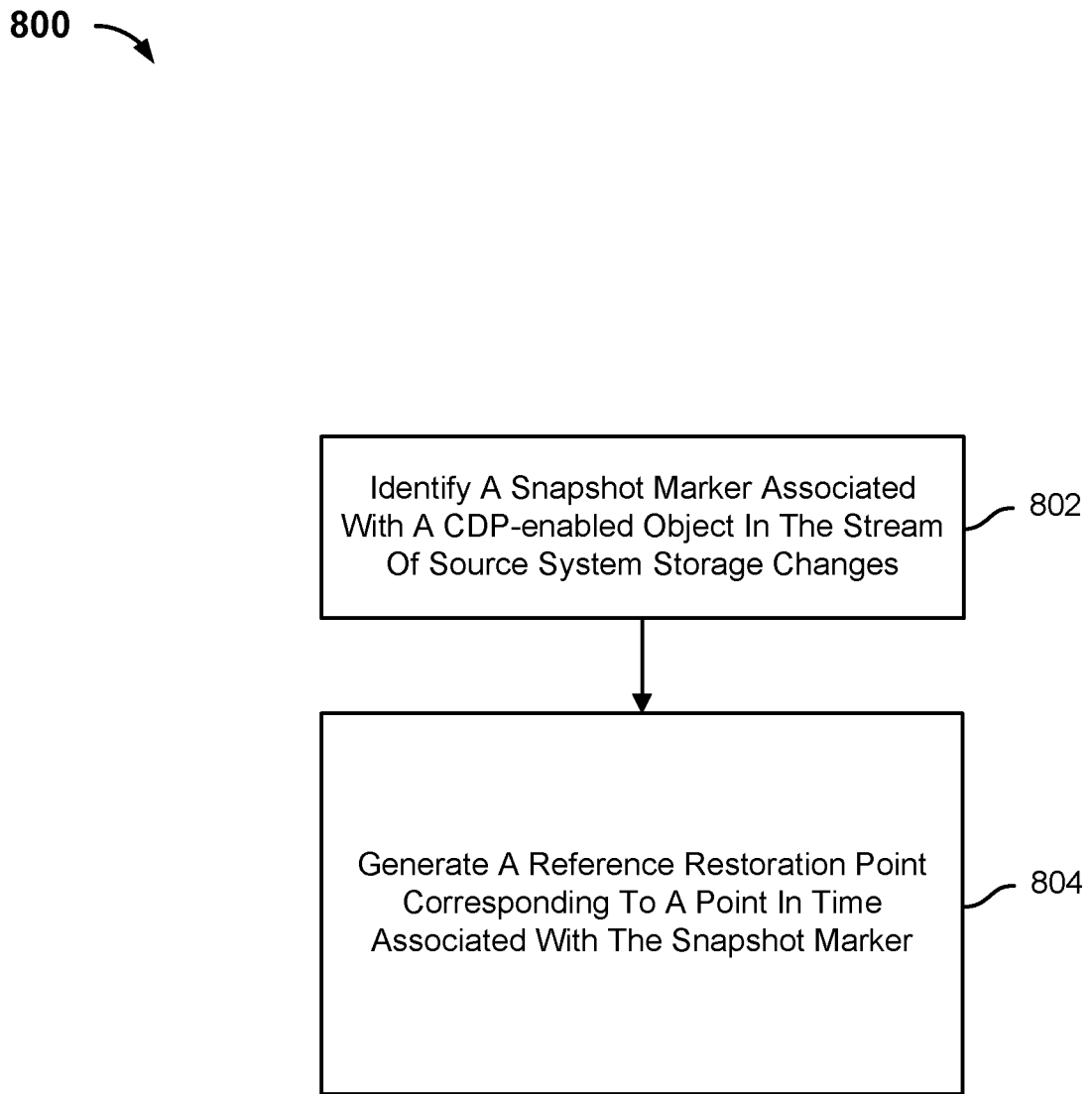
FIG. 8 is a flow diagram illustrating an embodiment of a process for generating a reference restoration point for a continuous data protection-enabled object in accordance with some embodiments.

FIG. 8 is a flow diagram illustrating an embodiment of a process for generating a reference restoration point for a continuous data protection-enabled object in accordance with some embodiments. In some embodiments, process 800 is implemented to perform some or all of step 612 of process 600 or step 710 of process 700. In the example shown, process 800 may be implemented by a backup system, such as backup systems 112, 140 or a remote data recovery system, such as remote data recovery systems 122, 170.

At 802, a snapshot marker associated with a CDP-enabled object is identified in the stream of source system storage changes. A log associated with a CDP-enable object may include a snapshot marker. A write filter attached to the CDP-enabled object hosted on the source system is configured to insert the snapshot marker in between intercepted write IOs associated with the CDP-enabled object. The snapshot marker may include a timestamp that indicates a point in time at which a reference restoration point is to be generated.

At 804, a reference restoration point corresponding to a point in time associated with the snapshot marker is generated. The reference restoration point may be generated by identifying the tree data structure corresponding to a previous reference restoration point and cloning a root node of the tree data structure corresponding to the previous reference restoration point. For example, the root node of the tree data structure corresponding to the previous reference restoration point may be cloned in a manner that is described above with respect to FIG. 3B.

The entries of intercepted write IOs stored in a log file may correspond to one or more data changes (e.g., data, metadata, or both) to a CDP-enabled object. In some embodiments, the file system manager of the backup system applies to the cloned tree data structure the entries included in a log file of the CDP service of the backup system that occurred after a timestamp associated with the previous reference restoration point and before a timestamp associated with the snapshot marker.

In some embodiments, the file system manager of the remote data recovery system applies to the cloned tree data structure the entries included in a log file of the CDP service of the remote data recovery system that occurred after a timestamp associated with the previous reference restoration point and before a timestamp associated with the snapshot marker.

For example, the data changes may be applied to the cloned tree data structure in a manner that is described above with respect to FIGS. 3C-3D.

Figure 9:
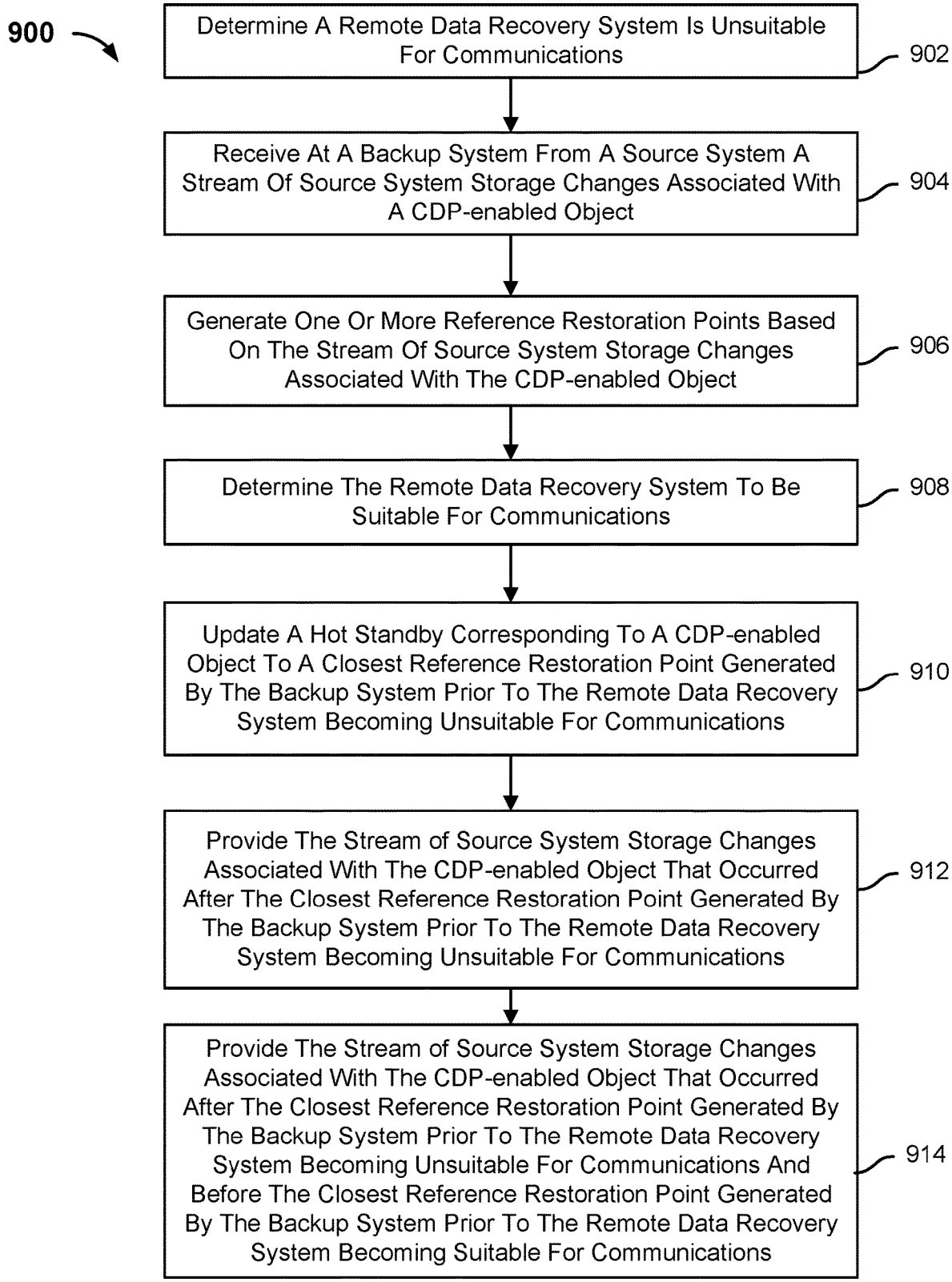
FIG. 9 is a flow diagram illustrating an embodiment of a process for updating a hot standby corresponding to a CDP-enabled object.

FIG. 9 is a flow diagram illustrating an embodiment of a process for updating a hot standby corresponding to a CDP-enabled object. In the example shown, process 900 may be implemented by a backup system, such as backup systems 112, 140.

At 902, the remote data recovery system is determined to be unsuitable for communications with the backup system. The remote data recovery system may be determined to be unsuitable for communications with the backup system if a network connection failure exists, the remote data recovery system is offline, the remote data recovery system has insufficient resources available to participate in communications with the backup system, the remote data recovery system is scheduled for maintenance, etc.

In some embodiments, the remote data recovery system periodically sends a heartbeat signal to the backup system. The backup system may determine that the remote data recovery system is determined to be unsuitable for communications in the event the heartbeat signal is not received within a threshold time period.

The backup system is configured to provide to the remote data recovery system a stream of source system storage changes. The remote data recovery system may provide an acknowledgement signal in response to receiving a source system storage change. The backup system may determine that the remote data recovery system is unsuitable for communications in the event the acknowledgement signal is not received within a threshold time period.

At 904, a stream of source system storage changes associated with a CDP-enabled object is received at the backup system from a source system while the remote data recovery system is unsuitable for communications. The backup system may continue to receive the stream of source system storage changes associated with a CDP-enabled object received at 608 while the remote data recovery system is unsuitable for communications.

A change included in the stream may include metadata associated with a change, data associated with a change, or both. The stream of source system storage changes is stored in a buffer by a CDP service associated with the backup system. A log associated with a CDP-enabled object may include a snapshot marker. The snapshot marker may include a timestamp that indicates a point in time at which a reference restoration point is to be generated.

At 906, one or more reference restoration points are generated based on the stream of source system storage changes associated with the CDP-enabled object. The backup system generates a reference restoration point by cloning a tree data structure associated with a previous reference restoration point and applying changes indicated by the source system storage changes associated with the CDP enabled object that occurred after the previous reference restoration point and before the snapshot marker that occurred after the previous reference restoration point.

At 908, the remote data recovery system is determined to be suitable for communications. For example, a network connection failure may no longer exist, the remote data recovery system is back online, the remote data recovery system has sufficient resources available to participate in communications with the backup system, the remote data recovery system scheduled maintenance has been completed, etc. A heartbeat signal may be received at the backup system from the remote data recovery system.

At 910, a hot standby corresponding to the CDP-enabled object is updated to a closest reference restoration point generated by the backup system prior to the remote data recovery system becoming suitable for communications. The backup system may update the hot standby corresponding to the CDP-enabled object by providing to the remote data recovery system data chunks that are not stored by the remote data recovery system that are associated with a closest reference restoration point generated by the backup system prior to the remote data recovery system becoming suitable for communications.

The backup system determines the data chunks that are not stored by the remote data recovery system by determining a difference between a closest reference restoration point generated by the backup system prior to the remote data recovery system becoming suitable for communications and the closest reference restoration point generated by the backup system prior to remote data recovery system becoming unsuitable for communications. In some embodiments, the determine difference is based on a closest reference restoration point generated by the backup system prior to the remote data recovery system becoming suitable for communications and a restoration point that corresponds to a last IO sent to the remote data recovery system (indicted by the "X" in FIG. 2B).

The determined difference may be determined by traversing the tree data structure corresponding to the closest reference restoration point generated by the backup system prior to the remote data recovery system becoming suitable for communications and the tree data structure corresponding to the closest reference restoration point generated by the backup system prior to the remote data recovery system becoming unsuitable for communications to determine the data chunks (e.g., data, metadata, or both) associated with a closest reference restoration point generated by the backup system prior to the remote data recovery system becoming suitable for communications that are not stored by the remote data recovery system.

For example, the metadata structure with root node 402 of FIG. 4D may be the tree data structure corresponding to the closest reference restoration point generated by the backup system prior to the remote data recovery system becoming unsuitable for communications and the metadata structure with root node 404 may be the tree data structure corresponding to the closest reference restoration point generated by the backup system prior to the remote data recovery system becoming suitable for communications. The one or more data chunks that are not stored by the remote data recovery system may be the one or more data chunks associated with "Brick 6."

The backup system is configured to provide the determined data changes to the remote data recovery system. In response to receiving the data changes, the remote data recovery system is configured to generate an intermediate reference restoration point by updating the hot standby corresponding to the CDP-enabled object based on the received data changes.

At 912, the stream of source system storage changes associated with the CDP-enabled object that occurred after the closest reference restoration point generated by the backup system prior to the remote data recovery system becoming suitable for communications are provided from the backup system to the remote data recovery system. The changes included in this stream is a first subset of the stream of source system changes received at 904.

In response, the remote data recovery system is configured to update the hot standby corresponding to the CDP-enabled object based on the stream of source system storage changes. As a result, the specified RPO and/or RTO associated with the CDP-enabled object is more likely to be achieved.

At 914, the stream of source system storage changes associated with the CDP-enabled object that occurred after the closest reference restoration point generated by the backup system prior to the remote data recovery system becoming unsuitable for communications and before the closest reference restoration point generated by the backup system prior to the remote data recovery system becoming suitable for communications are provided from the backup system to the remote data recovery system. The changes included in this stream is a second subset of the stream of source system changes received at 904.

In response, the CDP service of the remote data recovery system may store and log the source system storage changes. In some embodiments, the file system manager of the remote data recovery system generates one or more intermediate reference restoration points corresponding to the reference restoration point(s) that were generated by the backup system during the period where remote data recovery system was unsuitable for communications (e.g., back fill). This allows the hot standby corresponding to the CDP-enabled object to be recovered to any point in time for which there is an associated source system storage change.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving at a backup system from a source system a stream of source system storage changes associated with an object;
providing the source system storage changes associated with the object to a remote data recovery system, wherein each change included in the stream of source system storage changes associated with the object is associated with a corresponding sequence number, wherein the remote data recovery system is configured to store the provided source system storage changes associated with the object; and
utilizing the backup system to generate one or more reference restoration points based on the stream of source system storage changes associated with the object.

2. The method of claim 1, wherein the object is a continuous data protection-enabled object.

3. The method of claim 1, wherein the object is one of a database, a virtual machine (VM), an application, a container, or a pod.

4. The method of claim 1, wherein the source system storage changes associated with the object include write input/outputs (IOs) associated with the object.

5. The method of claim 1, wherein the stream of source system storage changes associated with the object are stored in an intermediate storage at the backup system.

6. The method of claim 5, wherein providing the source system storage changes associated with the object to the remote data recovery system includes replicating the stream of source system storage changes associated with the object from the intermediate storage at the backup system to the remote data recovery system.

7. The method of claim 1, wherein the remote data recovery system updates a hot standby corresponding to the object based on the stream of source system storage changes associated with the object.

8. The method of claim 1, wherein the remote data recovery system generates one or more reference restoration points based on the stream of source system storage changes associated with the object.

9. The method of claim 8, wherein the one or more reference restoration points generated by the remote data recovery system are generated at a different points in time than the one or more reference restoration points generated by the backup system.

10. The method of claim 1, further comprising determining that the remote data recovery system is unsuitable for communications with the backup system.

11. The method of claim 10, further comprising generating one or more additional reference restoration points based on the stream of source system storage changes associated with the object.

12. The method of claim 11, further comprising determining that the remote data recovery system is suitable for communications with the backup system.

13. The method of claim 12, further comprising updating a hot standby corresponding to the object hosted on the remote data recovery system, wherein the hot standby corresponding to the object hosted on the remote data recovery system is updated to a closest reference restoration point generated by the backup system prior to the remote data recovery system being determined to be suitable for communications.

14. The method of claim 13, further comprising providing to the remote data recovery system a first subset of the stream of source system storage changes associated with the object, wherein the first subset of the stream of source system storage changes associated with the object include data changes associated with the object that occurred after the closest reference restoration point generated by the backup system prior to the remote data recovery system being determined to be suitable for communications.

15. The method of claim 14, further comprising providing to the remote data recovery system a second subset of the stream of source system storage changes associated with the object, wherein the second subset of the stream of source system storage changes associated with the object include changes associated with the object that occurred after the closest reference restoration point generated by the backup system prior to the remote data recovery system being determined to be unsuitable for communications and before the closest reference restoration point generated by the backup system prior to the remote data recovery system being determined to be suitable for communications.

16. A computer program product embodied in a non-transitory computer readable medium and comprising computer instructions for:
receiving at a backup system from a source system a stream of source system storage changes associated with an object;
providing the source system storage changes associated with the object to a remote data recovery system, wherein each change included in the stream of source system storage changes associated with the object is associated with a corresponding sequence number, wherein the remote data recovery system is configured to store the provided source system storage changes associated with the object; and
utilize the backup system to generate one or more reference restoration points based on the stream of source system storage changes associated with the object.

17. The computer program product of claim 16, wherein the remote data recovery system generates one or more reference restoration points based on the stream of source system storage changes associated with the object.

18. The computer program product of claim 17, wherein the one or more reference restoration points generated by the remote data recovery system are generated at a different frequency than the one or more reference restoration points generated by the backup system.

19. A system, comprising:
a processor configured to:
receive at a backup system from a source system a stream of source system storage changes associated with an object;
provide the source system storage changes associated with the object to a remote data recovery system, wherein each change included in the stream of source system storage changes associated with the object is associated with a corresponding sequence number, wherein the remote data recovery system is configured to store the provided source system storage changes associated with the object; and utilize the backup system to generate one or more reference restoration points based on the stream of source system storage changes associated with the object; and a memory coupled to the processor and configured to provide the processor with instructions.

* * * * *